: US008413883B2

(12) United States Patent
McCormick

(10) Patent No.: US 8,413,883 B2
(45) Date of Patent: Apr. 9, 2013

(54) MANAGING STOCK INVENTORY LEVELS

(75) Inventor: Kevin Lee McCormick, Fremont, WI (US)

(73) Assignee: Ziti Technologies Limited Liability Company, Dover, DE (US)

( * ) Notice: Subject to any disclaimer, the term of this patent is extended or adjusted under 35 U.S.C. 154(b) by 5 days.

(21) Appl. No.: 13/035,751

(22) Filed: Feb. 25, 2011

(65) Prior Publication Data

US 2011/0208620 A1 Aug. 25, 2011

Related U.S. Application Data

(63) Continuation of application No. 11/639,773, filed on Dec. 15, 2006, now Pat. No. 7,896,244.

(51) Int. Cl.
*G06F 17/00* (2006.01)

(52) U.S. Cl.
USPC ............ 235/375; 235/383; 235/385; 705/1.1; 705/28

(58) Field of Classification Search .................. 235/375, 235/383, 385; 705/1.1, 28
See application file for complete search history.

(56) References Cited

U.S. PATENT DOCUMENTS

| 4,771,383 | A |   | 9/1988  | Takahashi          |         |
|-----------|---|---|---------|--------------------|---------|
| 5,101,352 | A |   | 3/1992  | Rembert            |         |
| 5,596,493 | A |   | 1/1997  | Tone et al.        |         |
| 5,819,232 | A |   | 10/1998 | Shipman            |         |
| 5,963,919 | A | * | 10/1999 | Brinkley et al. ................ | 705/28  |
| 6,044,357 | A |   | 3/2000  | Garg               |         |
| 6,151,582 | A |   | 11/2000 | Huang et al.       |         |
| 6,668,245 | B1 |   | 12/2003 | Iida              |         |
| 7,249,068 | B1 |   | 7/2007  | Kakouros et al.   |         |
| 7,523,048 | B1 |   | 4/2009  | Dvorak            |         |
| 2001/0032146 | A1 |   | 10/2001 | Kutaragi et al. |         |
| 2001/0049690 | A1 | * | 12/2001 | McConnell et al. ....... | 707/104.1 |
| 2002/0138336 | A1 |   | 9/2002  | Bakes et al.      |         |
| 2002/0147651 | A1 | * | 10/2002 | Hoar et al. ...................... | 705/22 |
| 2002/0174001 | A1 |   | 11/2002 | Henry             |         |
| 2003/0216969 | A1 |   | 11/2003 | Bauer             |         |
| 2003/0225635 | A1 |   | 12/2003 | Renz et al.       |         |
| 2004/0128202 | A1 |   | 7/2004  | Baum et al.       |         |
| 2005/0075920 | A1 |   | 4/2005  | Li et al.         |         |
| 2006/0009988 | A1 | * | 1/2006  | McCormick ...................... | 705/1 |

FOREIGN PATENT DOCUMENTS

| EP | 1 079 317    | 2/2001  |
|----|--------------|---------|
| EP | 1 255 214    | 11/2002 |
| EP | 1 521 197    | 4/2005  |
| WO | WO 92/18939  | 10/1992 |
| WO | WO 99/67729  | 12/1999 |
| WO | WO 01/82170  | 11/2001 |
| WO | WO 02/41110  | 5/2002  |
| WO | WO 02/063542 | 8/2002  |

* cited by examiner

*Primary Examiner* — Allyson Trail
(74) *Attorney, Agent, or Firm* — Knobbe Martens Olson & Bear LLP

(57) ABSTRACT

The present invention provides a method of managing a stock replenishment system in a way that explicitly controls the in-stock rate. Also provided by the present invention is a method of managing a collection of stock replenishment systems in a way that the combined in-stock rate of the collection is controlled to a selected value. In addition, the present invention provides a method to set up a collection of stock replenishment systems in replenishment software systems in an identical fashion while controlling the combined in-stock rate. The methods of the present invention use point-of-sale data to determine packages-per-shopper rates, which are used as one of the inputs to statistical models of multiple-day retail sales.

25 Claims, 8 Drawing Sheets

MANAGING STOCK INVENTORY LEVELS

CROSS-REFERENCE TO RELATED APPLICATIONS

This application is a continuation of application Ser. No. 11/639,773, filed Dec. 15, 2006, issued as U.S. Pat. No. 7,896,244 on Mar. 1, 2011, the entirety of which is herein incorporated by reference.

BACKGROUND

1. Field

The present invention generally relates to a method of controlling out-of-stock incidence rates at retail stores or other supply facilities.

2. Description of the Related Art

A consumer often enters a retail store to purchase a specific single product or a specific set of products. Often, a consumer will purchase a specific brand for a given product or products the consumer is seeking to purchase. When a branded product at a retail store goes out-of-stock, meaning that no packages of the product are available for purchase, potential sales of that branded product may be lost for both the supplier of the branded product and the retail store selling the product. If the consumer cannot purchase a specific branded product at the retail store, because the product is out-of-stock, the consumer will typically have one of three reactions. The consumer may purchase a replacement product, which may be a different brand of a similar product; the consumer may leave the retail store and go to another retail store to purchase the specific branded product; or the consumer may not purchase a replacement item or attempt to purchase the product at another retail store, which may lead to the realization by the consumer that the product is no longer needed or desired.

Each of these reactions by the consumer has implications for both the retailer and the manufacturer or supplier of the product. When a consumer decides to purchase a replacement product, which may be a product from a competitor of the manufacturer or supplier of the product which the consumer originally intended to purchase, the manufacturer or supplier of the original product the consumer desired to purchase loses a sale of its product. In addition, if the replacement product does not function as expected, the consumer may look for another retailer to purchase the desired branded product. In that instance, the retailer may lose a consumer to another retail competitor that regularly stocks the desired branded product. If the consumer decides to go to another retailer to purchase the desired out-of-stock product at the first retailer, the first retailer will lose the sale on the desired items and possibly other items in which the consumer intended to purchase along with the desired item. Alternatively, the consumer may decide that the desired item is no longer needed, resulting in both the retailer and supplier of the product losing sales. As a result, both the retailer and the supplier have a vested interest in maintaining stock of products on the shelves of the retail store and preventing the occurrence out-of-stock events on each of the products it sells.

An obvious, though undesirable, solution to the problem is to simply do what it takes to ensure that inventory levels are kept very high at all times at the retail stores. However, having a large inventory of products in a retail store or distribution center presents other problems for the retailer and supplier such as storage space, proper product rotation (first in-first out), high cost of capital outlay for the products and the like.

There is a need in the art for a method to efficiently and effectively control the out-of-stock incidence rate at retail stores and other supply facilities without having too much stock on hand.

Currently, retailers and suppliers use stock replenishment systems to manage inventory of a single product in a single retail store. That is, each stock keeping unit (SKU) present in a given retail store is managed by a separate replenishment system. A collection of the stock replenishment systems is needed to control the stock of several different products in a given retail store. For example, if a supplier sells 50 different items in a given retail store (i.e., there are 50 different SKU's), the supplier needs to manage 50 different replenishment systems to manage the inventory. In the situation where the retailer is a large chain retailer with 500 or more retail stores, the supplier will need to operate and manage 25,000 or more replenishment systems. While each of these replenishment systems could be set-up and managed independently, both the retailer and supplier have a fundamental need in solving how to set up a collection of inventory-replenishment systems in a way that controls the combined out-of-stock incidence rate. There is a need in the art to manage a collection of stock replenishment systems without managing each of these systems individually or without carrying more inventory than necessary.

SUMMARY

In one embodiment of the present invention, the present invention provides a method of controlling a stock replenishment system. In this method, a user defines an acceptable out-of-stock probability for a given item for any given day. Generally, the probability may be set to a fairly low number or percentage. Point-of-sale data is obtained for the given product for a given time period. From the point-of-sale data, a statistical distribution of the packages per shopper is determined. The average packages per shopper may be determined. An expected daily sales is determined. The expected daily sales may be estimated from a near term forecast, by using a trailing average daily sales or by using the point-of-sale data to determine the average total sales per store per day. From the expected daily sales and average packages per shopper, a multi day maximal sales number is determined for the given item which corresponds to the selected out-of-stock probability. The maximal daily sales is based on the expected daily sales and average packages per shopper and is the volume of sales on a given day that has a probability of occurrence less than the out-of-stock probability defined. Next, the reorder point of the stock replenishment software is set to a point based on the maximal sales, which results in the chance of going out-of-stock of the single item to be less than the probability defined by the user.

The maximal sales may be determined by using a Compound Poisson distribution or a Negative Binomial distribution. That is, the parameters of each distribution are determined. From the parameters, in the case of the Compound Poisson distribution two or more parameters, and in the case of a Negative Binomial distribution two parameters, the maximal sales should be determined for a period of a lead time plus one day. As a result, the parameters of the Compound Poisson distribution determined from the point-of-sale data should be considered for lead time (in days) plus one day. In this regard, the average shoppers per day parameter of the Compound Poisson distribution is multiplied by the lead time plus one day (L+1) to account for the lead time. The same is true for the Negative Binomial distribution.

In another embodiment of the present invention, provided is a method of managing a collection of stock replenishment systems controlling one or more items at one or more stores in a way that controls a combined measure of in-stock occurrence across the collection of stock replenishment systems. In this embodiment, a combined in-stock objective for all items in all stores controlled by the collection of stock replenishment systems that are in-stock on any given day is defined. Next, a meets objective, which is the percentage of time that the combined in-stock objective is desired to be met across all stores and all items controlled by the collection of stock replenishment systems, is defined. From the defined combined in-stock objective and the defined meets objective, a common single-store single-item out of stock probability is determined. This single-store single item out-of-stock probability is employed for each of the stock replenishment system of the collection of stock replenishment systems. The point-of-sale data for each item at each store on the collection of stock replenishment systems is obtained. The maximal sales for each store and each item on the collection of stock replenishment systems is determined, wherein the maximal sales corresponds to the common single-store single item out-of-stock probability. Then, the reorder point for each stock replenishment system software program is set based on the maximal sales.

In a further embodiment of the present invention, the present invention provides a method of managing a collection of stock replenishment systems across two or more products which may be located at one or more stores. The products controlled by the collection of replenishment systems in this embodiment of the present invention should each have the same lead-time, which is the time it takes between when an order is placed for a product and when the product arrives at the store. In the method of this embodiment of the present invention, it is first determined which stores and which items at those stores have the same lead-time. Once the items are identified, a combined in-stock objective for all items in all stores controlled by the collection of stock replenishment systems as a desired fraction of the stock replenishment systems that are in-stock. Next, a meets objective for the percentage of time that the combined in-stock objective is desired to be met across all stores and all items controlled by the collection of stock replenishment systems is defined. For each common lead time, a single-store out-of-stock probability for any given item for any given day is determined from the defined in-stock objective and defined meets objective. For each common lead-time, the highest average packages per shopper for all items being controlled on the collection of stock replenishment systems is determined. Next, the parameters of a Negative Binomial distribution for the item with the highest average packages per shopper are estimated. The reorder point is then approximated as a linear function which is dependent on the average daily sales and an intercept with the reorder point axis, by setting the slope of the line and the intercept with the reorder point axis which approximates the line that best fits the linear function. The collection of stock replenishment software programs which have the same lead-time are set to calculate the reorder point as a slope times the average daily sales plus the intercept point.

In the present invention, a Negative Binomial distribution may be used as an approximation of a Compound Poisson distribution.

An important and somewhat surprising result of the last embodiment of the present invention is that under certain, relatively non-restrictive conditions, standard replenishment software can be coerced into executing the method of the present invention by using a common collection of settings across a multitude of store/product combinations. In general terms, the method of the present invention applies a "reorder point/order quantity" system to each store/product combination. The reorder points are calculated specific to each store/product combination in a way that statistically assures the collective performance of all of the store/product replenishment systems. Inputs to the method include an overall out-of-stock target, a large percentage of time the target is to be achieved, and specific statistical summaries of daily point-of-sale retail data.

DEFINITIONS

Figure 1:
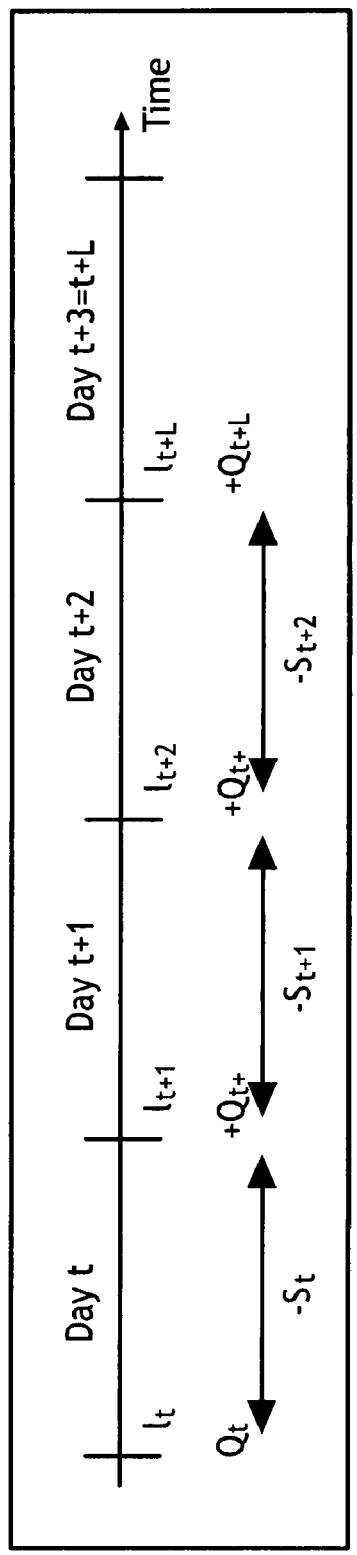
FIG. 1 graphically illustrates the reorder logic timeline for a lead time of three days (L=3) and is a graphical representation of the two equations for $I_{t+L}$.

It should be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein the term "replenishment system" (RS) is an algorithm that is often implemented using a software system to determine and order products as the product stock in a retail store, supply room or distribution center is depleted due to sales, use or other factors, such as spoilage or product is beyond the expiration date.

As used herein, the phrase "reorder point" (R) means the determined quantity of packages on the retail store shelf or supply room shelf at which an out-of-stock event has a relatively high probability of occurring if an order is not placed. When the quantity of a product is at or below the reorder point, the replenishment system will reorder the product.

As used herein, the phrase "base order quantity" (B) is the minimum order quantity that can be made for a given product. Typically, product is shipped in cases, and each case contains a number of packages of product. For example, if a minimum order is one case, and the case contains 4 packages of product, then the base order quantity is 4. If each case contains 12 packages of product, then the base order quantity is 12. The number of packages in any order must be an integer multiple of the base order quantity.

As used herein, the phrase "order quantity" (Q) is an integer (K) multiple of the base order quantity. For example, if the base order quantity is one case, each case contains 12 packages, and 3 cases are ordered, then the order quantity is 36 packages (12 packages/case×3 cases). Defined mathematically, Q=K×B.

As used herein, the term "package or packages" is a unit of a product as sold in a retail store or available in a supply room. A package could be a single product or a plurality of products. A package may be the product alone, without any outer wrappers or packaging or may be a product within packaging.

As used herein, the term "shopper" means an individual who purchases a given product in a retail store. The term does not include a person who enters a retail store and does not purchase the given product. For example, if the given product is a specific stock keeping unit (SKU) of a diaper and a person enters a retail store and purchases the given product, then this person is considered a shopper. If a person enters a retail store and does not purchase the given product, then this person is not considered a shopper for the purposes of the present invention. In the supply room, a shopper is on who removes the items from the supply room.

As used herein, the term "lead-time" is the period of time in days that it takes to receive an order of a given product once an order is placed. For example, if an order is placed on Monday and the order arrives on Tuesday, then the lead-time is one day. If an order is placed on Monday and arrives Wednesday, then the lead-time is two days.

As used herein, the term "retail store" is intended to mean any establishment which sells products to a consumer or user, and may include actual retail stores, discount stores, warehouse stores, mail order stores, internet stores and the like. Retail store, as used herein also is intended to mean a facility which supplies products, such as a store room.

As used herein, the term "maximal sales" is intended to mean a number of packages for which the probability of selling more than that number of packages over a specified time period is less than a specified probability $\pi$. "Maximal sales" is the sales level that will only be exceeded at most $\pi$ percentage of time.

As used herein, the term "committed inventory" is intended to represent the inventory of packages of a product at a retail store or supply room at the start of a day plus the packages of product in transit to the retail store which are scheduled to arrive on a given day.

As used herein, the term "out-of-stock" is intended to mean that there are no packages of product available for sale at the retail store or is not available at a supply facility.

As used herein, the term "in-stock" is intended to mean that there is at least one package of product available for sale at the retail store or is available at a supply facility.

As used herein, the term "reorder" is intended to represent a request for one or more packages of product to be sent to a retail store form a supply location, including but not limited to a distribution center or the manufacture of the product.

DETAILED DESCRIPTION

In the following detailed description of the present invention, reference is made to the accompanying drawings which form a part hereof, and in which is shown by way of illustration, specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present invention. The following detailed description is, therefore, not to be taken in a limiting sense, and the scope of the present invention is defined only by the appended claims, along with the full scope of equivalents to which such claims are entitled.

To gain a better understanding of the present invention, a brief explanation of inventory in retail stores will be discussed. From day to day, sales at a retail store decrease inventory and replenishment orders increase inventory. At the start of each day, the committed inventory is calculated as the inventory of packages of a product at the retail store is accounted for plus the packages of product in transit to the retail store which are scheduled to arrive on a given day. If the committed inventory is at or below a set reorder point (R), an order is generated that will be received L days later. L is the lead-time or the delay of time in days which it takes to get the product from a distribution center of the retailer or manufacturer to the retail store. Typically, the size of the order is set to be the smallest integer (K) multiple of the base order quantity (B) which will make the sum of the inventory of packages within the retail store plus the packages in-transit plus new order greater than the reorder point (R).

Stated in a mathematical formula, the day to day inventory is defined in equation 1 as:

$$I_{t+1} = I_t + Q_{t+1} - S_t \quad (1)$$

where $I_t$=the inventory at the start of Day t (units of product or packages)

$I_{t+1}$=the inventory at the start of Day t+1, $Q_{t+1}$=the order quantity: placed the morning of Day t, received by Day t+1, assuming that the lead-time L is one day. Q must be an integer multiple of B base order quantity. (units)

$S_t$=Sales for Day t (units)

Inserting lead-time considerations into the equation, an order placed the morning of Day t (after recognizing $Q_t$) is received in time for calculating $I_{t+L}$. If additional orders are set to arrive in between the day t and day t+L, the orders arriving must be taken into account in calculating the inventory on Day t+L. This leads to a logical restatement of the day-to-day inventory equation in terms of L is set forth in equation (2):

$$I_{t+L} = I_t + \sum_{i=1}^{L} Q_{t+i} - \sum_{i=0}^{L-1} S_{t+i} \quad (2)$$

Stated in words, the inventory on Day t+L, is equal to the inventory on Day t plus the sum of any orders arriving on days prior to Day t+L minus the sum of the products sold on day T through the day before Day t+L. To represent this graphically, FIG. 1 graphically illustrates the reorder logic timeline for an L=3 and is a graphical representation of the two equations for $I_{t+L}$. Each inventory level is shown at the beginning of the day, just prior to the store opening, but just after acknowledgement of an order that was received overnight. To get from $I_t$ to $I_{t+1}$, the sales from day t ($S_t$) is subtracted, and the following night's received order is added. Equation 2 can be rewritten as equation 3:

$$I_{t+L} = \left[I_t + \sum_{i=1}^{L-1} Q_{t+i}\right] + Q_{t+L} - \left[\sum_{i=0}^{L-1} S_{t+i}\right] \quad (3)$$

=Committed Inventory on the day before Day(t+L)+
Order to arrive on Day(L)−Sales prior to Day(L)

Reorder point/order quantity systems require that an order be placed at the start of Day t if the committed inventory on Day t falls below a set reorder point. It is pointed out in the present invention that the start of Day t is an arbitrary start time. For example, the start of the day could be 12 midnight, opening time, 12 noon, 2 pm or any other time during the day. Generally, in the present invention, the start of each day should be selected to be the same for all successive days. Prior to the present invention, the reorder point was typically set at an arbitrary number which was selected based on experience of the operator or retail store management, or was set based on the probability calculation utilizing the Normal (Gaussian) probability distribution. In contrast, the method of the present invention sets a reorder point based on the probability of going out-of-stock for a given item or items based on the point-of-sale data from which is derived a characterization of historical packages-per-shopper tendencies. The calculation of the reorder point will be described in more detail below.

The basic reorder equation requires that reorder quantity Q, which is the base order quantity B times an integer multiplier K. This is stated mathematically in Equation (4), $$R < \left[I_t + \sum_{i=1}^{L-1} K_{t+i} B\right] + K_{t+L} B \leq R + B \quad (4)$$

where Q=K×B
which can be rewritten as equation (5)

$$R < I_t + \sum_{i=1}^{L} K_{t+i} B \leq R + B \quad (5)$$

Typically reorder systems require that a reorder be made if the committed inventory on Day t is below the reorder point (R), but the order quantity should be an integer multiple (K) of a base order quantity B.

Figure 2:
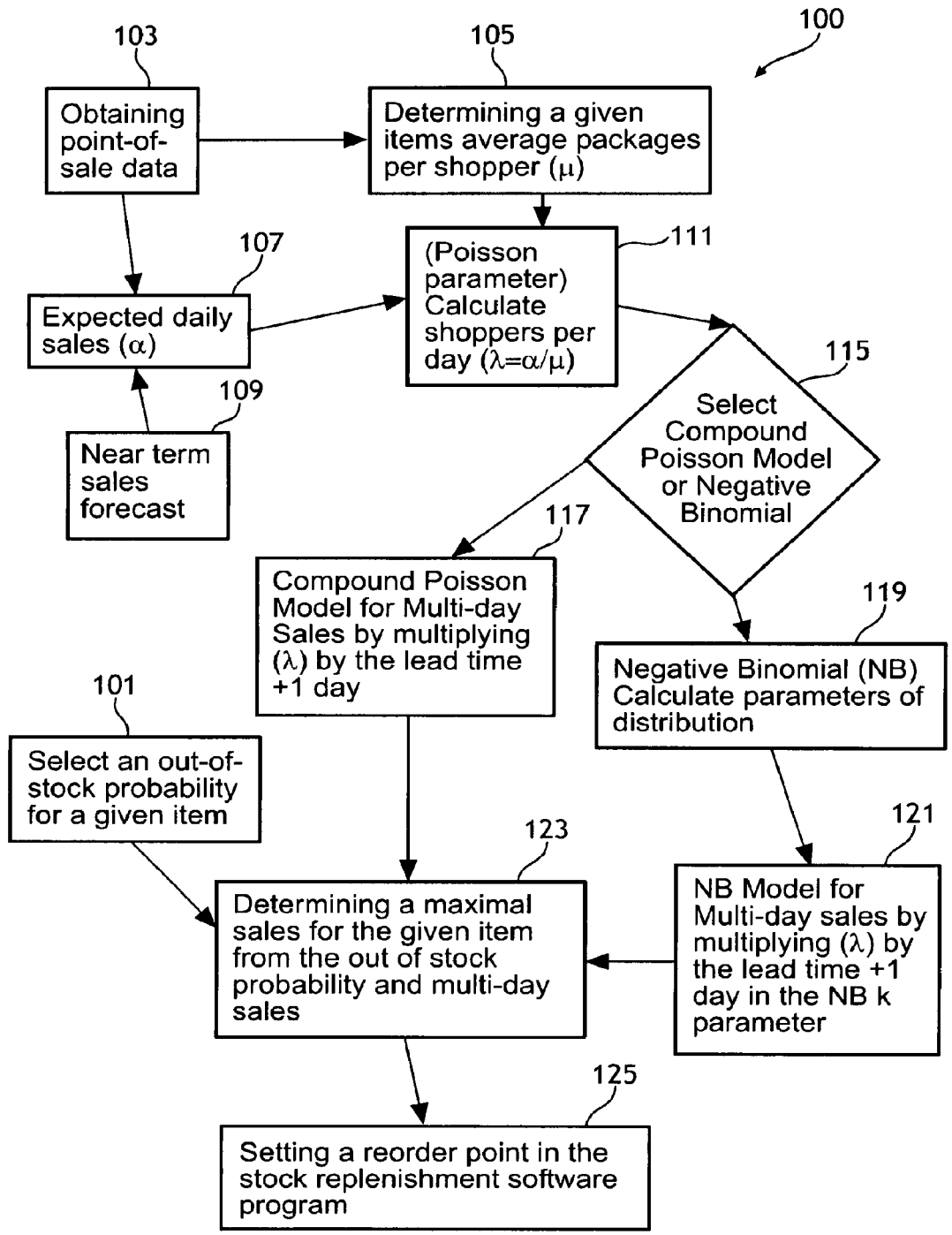
FIG. 2 is a flow diagram of the first embodiment of the present invention, showing the steps to control a single stock replenishment system.

In one embodiment of the present invention, the present invention provides a method of controlling or managing a single stock replenishment system. To gain a better understanding of this method, attention is directed to FIG. 2, which shows a brief overview of this embodiment of the present invention in the form of a flow diagram 100. In this method, a user defines an acceptable out-of-stock probability for a given item for any given day block 101. Generally, the probability may be set to a fairly low number or percentage. Concurrently, before, or after the out-of-stock probability is defined, point-of-sale data is obtained for the given product for a given time period block 103. From the point-of-sale data, an average packages per shopper $\mu$ is determined block 105. In addition, an expected daily sales a may also be determined from the point-of-sale data block 107. Alternatively, the expected daily sales may be estimated with a near term forecast block 109 or by using a trailing average daily sales. A Poisson distribution is used to Model the number of shoppers per day. From the expected daily sales a and average packages per shopper $\mu$, the Poisson parameter $\lambda$, which is the average shoppers per day, is calculated block 111. At this point a decision must be made to use a Compound Poisson Model or a Negative Binomial Model to determine the maximal sales. This decision point is shown a block 115. This decision is based on whether or not the packages per shopper distribution appears to be a Logarithmic distribution or not. If the packages per shopper distribution appears to be logarithmic, then the Negative Binomial Model may be used. If the packages per shopper distribution does not appear to be logarithmic, then the Compound Poisson Model will be used to determine the maximal sales for the given item. How to select the appropriate model is discussed in detail below.

If the Compound Poisson Model is used, the Poisson parameter $\lambda$, which is the average shoppers per day is multiplied by the lead time for the given item plus one day (L+1), as is shown in block 117, to account for multi-day sales. Next a maximal sales number is determined block 123 for the given item which corresponds to the selected out-of-stock probability from block 101. That is, based on the average total sales and average packages per shopper, what is the volume of sales on a given day that has a probability of occurrence less than the out-of-stock probability defined. Next, the reorder point of the stock replenishment software is set block 125 to a point based on the maximal sales, which results in the chance of going out-of-stock of the single item to be less than the probability defined by the user.

If a Negative Binomial Model is used, the parameters of the Negative Binomial distribution are calculated, block 119. The method to calculate the Negative Binomial parameters is discussed in more detail below. The average shoppers per day $\lambda$ is multiplied by the lead time for the given item plus one day (L+1), as is shown in block 117, to account for multi-day sales. Next a maximal sales number is determined block 123 for the given item which corresponds to the selected out-of-stock probability from block 101. That is, based on the average total sales and average packages per shopper, what is the volume of sales on a given day that has a probability of occurrence less than the out-of-stock probability defined. Next, the reorder point of the stock replenishment software is set block 125 to a point based on the maximal sales, which results in the chance of going out-of-stock of the single item to be less than the probability defined by the user.

As is set forth above, in this embodiment of the present invention, a user defines an acceptable single-store out-of-stock probability for a given item for any given day. By "acceptable" it is meant that the probability of going out-of-stock is set to a value that the user is willing to accept as the chance of going out-of-stock for the given item. Generally, the probability $\pi$ is set to a relatively low number, such as less than 10%, typically less than 5% and more generally less than about 1%, and in each case greater than 0%. In one aspect of the present invention, the probability $\pi$ of going out-of-stock for a given item is set between 0.01% and 10%, typically between 0.02% and 5%, more typically between 0.1% and 1.0%. One specific example of a probability of going out-of-stock is 0.5%. Accordingly, the in-stock probability is equal to 1 minus π. (In-stock probability=1−π). For example, if the out-of-stock probability is set to 1%, the corresponding in-stock probability is 99%.

Before or after the probability of going out-of-stock is selected by the user, the user obtains the point-of-sale data over a given time period for the given item. Generally, the point-of-sale data is obtained for a period of time of at least one week. In one embodiment of the present invention, the point-of-sale data is obtained for a period of time between 7 and 180 days. Other periods of time may also be used, such as, for example, periods of time of about 60 to about 120 days. In one specific example, the point-of-sale data is collected over a period of 90 days.

From the point-of-sale data, a statistical distribution of packages per shopper is determined. This is referred to herein as the packages per shopper histogram. The average packages per shopper is determined by analyzing the packages per shopper histogram. Also, the standard deviation of the packages per shopper may also be obtained from average packages per shopper histogram. In addition, from the point-of-sale data, the average daily sales may also be determined. Alternatively, the average daily sales could be determined as expected daily sales by using known methods such as a near-term forecast or trailing average daily sales.

A maximal sales which corresponds to the defined out-of-stock probability (π), is next determined using the given item's packages per shopper histogram and the average daily sales. By "correspond" it is meant what volume of sales that will cause the probability of going out-of-stock to exceed the desired or set value. This volume of sales is the maximal sales. In the present invention, the maximal sales may be determined using various methods, including a Compound Poisson distribution or a Negative Binomial distribution. Determining the maximal sales via the Negative Binomial method and the Compound Poisson distribution is discussed in more detail below.

Once the maximal sales is determined, the reorder point of the stock replenishment software is set to a set point based on the maximal sales. Setting the reorder point based on the maximal sales results in the chance of going out-of-stock of the single item to be less than the probability (π) defined by the user.

Once the probability of going out-of-stock is selected by the user or retailer, the user or retailer must determine what an appropriate level of stock on any given day will trigger a order for more packages of product. That is, what level of inventory of Day t+L ($I_{t+L}$) is necessary to keep the out-of-stock probability from exceeding the defined probability π. Stated another way, what is the smallest amount of committed inventory on Day t+L, which is the Inventory on day t ($I_t$) plus the ordered inventory but which has not yet arrived but is scheduled to arrive before Day t+L, that must be present in the retail store, supply facility or scheduled to arrive at the retail store or supply facility prior to Day t+L to ensure that the chance of going out-of-stock does not exceed the defined probability.

To determine a value of the reorder point (R), the following consideration must be taken into account. Maximal sales over a course of the lead time plus one day (L+1 days) must be considered ($M_{L+1}$), since there needs to be enough product on hand to cover the sales for the day the order is made plus the lead time. Maximal sales is defined as the value that satisfies the following equation (6):

$$1 - \pi = Pr\left(\sum_{i=0}^{L} S_{t+i} \leq M_{L+1}\right) = Pr\left(R - M_{L+1} \leq R - \sum_{i=0}^{L} S_{t+i}\right) \quad (6)$$

This equation states that the probability that L+1 days sales is less than or equal to $M_{L+1}$ is 1−π. Alternatively, equation 6 states that the probability that L+1 days sales is greater than to $M_{L+1}$ is equal to or less than π. From the earlier equation:

$$R - \sum_{i=0}^{L} S_{t+i} < I_{t+L} - S_{t+L},$$

results in equation (7)

$$1 - \pi = Pr\left(R - M_{L+1} \leq R - \sum_{i=0}^{L} S_{t+i}\right) \leq Pr(R - M_{L+1} < I_{t+L} - S_{t+L}) \quad (7)$$

The objective of the reorder point and order quantity system is to ensure that $I_{t+L} - S_{t+L}$ stays above 0 with probability 1−π. Stated another way, $S_{t+L} - I_{t+L}$ should be less than 0 π percentage of the time. This means that: $R = M_{L+1}$ or stated in words, the reorder point is set at the maximal daily sales for the lead-time plus one day.

$$R = M_{L+1} \rightarrow 1 - \pi \leq Pr(0 < I_{t+L} - S_{t+L}) \quad (8)$$

So, in order to ensure that the probability of a store going out-of-stock on any given day is π, R is set to equal the maximal L+1 day sales $R = M_{L+1}$. Again, "maximal sales" is the sales level that will only be exceeded it percentage of time.

If the probability of going out-of-stock exceeds the defined value, then a reorder of the packages of product must be made. As a result, the reorder point (R) is set to the smallest integer amount of inventory that will keep the probability that an out-of-stock event will occur at or below the defined probability. If the committed inventory exceeds the reorder point (R), then an order is not placed. If the committed inventory falls below the reorder point, then a reorder of packages of product must occur. As a result, the objective is to keep the committed inventory above the reorder point (R) to keep the probability of an out-of-stock event occurring from exceeding the defined probability. As is mentioned above, to determine the reorder point (R), in accordance with the present invention, different methods may be utilized, including using an estimation of the parameters of a Negative Binomial distribution or using a Compound Poisson distribution.

On a specific day, "N" shoppers purchase the product from the store. The term "shopper" refers to someone who purchases the product in question in the retail store situation, or removes a product from a supply facility, and ignores those people who do not purchase or remove the product in question. The number of shoppers varies from day to day, so the number of shoppers is treated as a random variable. Using standard statistical theory, the number of shoppers should behave according to a "Poisson" distribution if: the shoppers make their purchase decisions independently of one another, the expected number of shoppers purchasing the product in a specific time interval is proportional to the length of the time interval (with a fixed constant of proportionality), and the probability of two or more shoppers purchasing the product at identically the same time is virtually zero. For practical purposes, if the rate at which shoppers enter the store is relatively constant over time, and if the shoppers don't collude, then the number of shoppers per day should be Poisson distribution.

The Poisson distribution is a single-parameter distribution, which is the mean or average (π) of the distribution.

Each shopper buying or removing the product will buy 1, 2, 3, or more packages of the product. As stated above, this model does not consider those people entering into the store which do not purchase the product in question, since they are not a shopper for the product in question. For example, Shopper No. 1 purchases $X_1$ packages, Shopper No. 2 purchases $X_2$ packages, etc. It is assumed that the $X_i$ are independent, identically-distributed random variables with a density function defined by $f_1, f_2, f_3, \ldots$ where $f_i$ is the probability of a shopper purchasing i packages of the product. The mean and standard deviation of the $X_i$ distribution are:

$$\text{Mean} = E(X_i) = \mu$$

$$\text{Variance} = V(X_1) = \sigma^2$$

As is pointed out above, there is an independence assumption which is simply stated that the number of packages purchased by one shopper doesn't influence the number of packages purchased by any of the other shoppers, which is the case in most retail situations.

The total amount of product purchased on a given day t by the N shoppers is:

$$S_t = X_1 + \ldots + X_N$$

$S_t$ is the sum of a random number of independent, identically-distributed random variables, where the number of random variables has a Poisson distribution. The distribution function for this sum is referred to in some statistical texts as a "Compound Poisson" distribution. The exact behavior of $S_t$ depends on the probability distribution governing the $X_i$. The mean and variance of $S_t$ can be written in terms of the mean and variance of the $X_i$ as:

$$\text{Mean} = E(S_t) = \lambda\mu$$

$$\text{Variance} = V(S_t) = \lambda(\sigma^2 + \mu^2)$$

That is, the mean or average number of packages sold in a given day $S_t$ or time period is the average number of shoppers for a given day or time period multiplied by the average number of packages per shopper. Therefore, the number of Shoppers per Day (λ) can be indirectly calculated by rearranging the relationship such that $$\lambda = \frac{E(S_t)}{\mu} = \frac{Avg\left(\frac{packages}{day}\right)}{Avg\left(\frac{packages}{shopper}\right)} = Avg\left(\frac{shoppers}{day}\right)$$

This indicates that the average number of shoppers per day can be calculated (based upon large-sample data) from the average of the packages-per-shopper distribution and the average daily sales.

In one embodiment of the present invention, the average packages-per-shopper (μ) is determined by a one-time analysis of the Packages-per-Shopper probability distribution based on historical point-of-sale data. In the method of the present invention, this behavior is assumed to be both static over time and identical from store to store. This is a characterization of the shopper's relationship with the product, and this relationship doesn't depend on which store the shopper frequents, and it does not change or does not change quickly over time. Therefore, according to the method of the present invention, it is not necessary to continually analyze the packages-per-shopper histogram or the average packages-per-shopper. However periodic reviews of the point-of-sale data may be used to confirm that there has not been a large shift in the average packages per shopper. Typically, period reviews my take place on an annual or semi-annual basis.

According to the method of the present invention, the only difference in one day's sales versus two days' sales is that over the course of two days, the expected number of shoppers is twice that it is for one day, or 2λ. Similarly for 3, 4, or any number of consecutive days over a period of anticipated stable short-term demand the only difference is the number of shoppers over the period of time. Given that any item order for restocking will not arrive at the retail store or storage facility for a lead time (L) plus one day, in order to determine the maximal daily sales for the lead time plus one day, the average shoppers per day (λ) should be multiplied by lead time (L) plus one day. As a result, the parameter of the Poisson distribution should be set to a value equal to (L+1) times λ to account for the multi day sales over the lead time plus one day. This is because the method of the present invention effectively models one day's sales, it also models two, three, four etc. day sales, with only a simple adjustment of the parameters of the distribution, in this case the average shoppers per day λ. As a result, the probability distribution may be used to describe the cumulative sales over a period of n days by simply multiplying the average shoppers per day times number of days in the period.

The daily sales $S_t$ arises from its components $X_i$ via:

$$S_t = X_1 + \ldots X_N$$

As stated earlier, if N is a random variable of the Poisson type, $S_t$ has what is referred to as a Compound Poisson distribution. The Compound Poisson distribution can take on a variety of forms, depending on the underlying distribution of the $X_i$. A well-known result from a probability theory is that if the distribution of $X_i$ is any member of the Logarithmic distribution, then $S_t$ behaves as a Negative Binomial random variable.

The Logarithmic density function is:

$$f_j = Pr(X_i = j) = c\frac{q^j}{j} \quad c = -\frac{1}{ln(1-q)} \quad 0 < q < 1 \quad j \in \{1, 2, \ldots\}$$

This is a density function which decreases as j increases. For small values of the parameter q, the decrease is very steep. The limiting case is the exclusively-one-package-per-basket situation, which is found by taking the limit:

$$\lim_{q \to 0} f(X_j) = \begin{cases} 1 & j = 1 \\ 0 & j > 1 \end{cases}$$

In retail situations, many products should behave like this, especially large-sized products where more than 1 package wouldn't fit well into a shopping cart. In these situations, the density will be dominated by a value of $f_1$ near 1 and have a very small $f_2$, and virtually non-existent $f_3$, $f_4$, etc. Also, in most situations where products that tend to be bought in 2's, 3's, etc., a retailer would eventually notice this trend and would request or require manufactures of the products to be bundled and sold as a bundle pack. As a result, the Logarithmic Distribution adequately models the packages-per-shopper behavior, and the Negative Binomial distribution will adequately describe the behavior of daily sales.

It has been discovered that if the average packages-per-shopper derived from the point-of-sale data is adequately modeled as a logarithmic distribution, then the Negative Binomial distribution may adequately describe the behavior of the daily sales. Generally, a logarithmic distribution is dominated by an $f_1$ frequency value with very small frequency values for $f_2$, $f_3$, $f_4$. Many times the $f_3$, and $f_4$ frequency values are non-existent. For purposes on example only, if the packages per shopper histogram shows that 85% of the shoppers purchase one package, less than 15% of shoppers purchase at least two packages and less than 2% of the shoppers purchase three or more packages, then average packages per shopper is logarithmic since the change in the frequency values tends to rapidly change. In this situation, the Negative Binomial distribution, will adequately model the expected daily sales. It is noted that the above percentages are for purposes of example only, and are not intended to be limiting.

The method present invention also calls for a number to describe the expected daily sales of the product at the store. This number certainly varies from store to store, and it most certainly varies over time. The expected daily sales plays a forward-looking role in the system, so this is where a "forecast" or anticipated changes in the daily sales would fit into the method of the present invention. In most steady-state situations, it would be very reasonable to use some sort of trailing moving average (exponentially-weight moving average, for example) of recent daily sales data. When abrupt sales-volume shifts are anticipated, an appropriately-horizoned forecast would be necessary. Thus, given values for the average packages per shopper ($\mu$) and the short-horizon expected daily sales, the Poisson parameter $\lambda$ is calculated.

Using this approach, the method of the present invention has segmented the elements of the model into two classes: static across stores and time, and fluid across stores and/or time. The fluid class is comprised of simply the short-term forecast, which is what may be typically re-evaluated on an ongoing basis. This allows for a greatly-reduced amount of data processing to maintain a system based upon the method, especially a system that involves a great many stores and products.

The Negative Binomial distribution is in general a two-parameter distribution capable of modeling a broad variety of discrete random variables. With the rationale involving the Logarithmic Distribution forcing it in certain situations, the method of the present invention adopts the broader approach, allowing the method to be applied to any situation where daily sales is adequately modeled by the Negative Binomial model. This necessarily includes the Logarithmic situation. For non-Logarithmic situations, the applicability can be assessed by testing the fit of the NB model to historical daily sales data.

A Negative Binomial distribution is defined by the equation (9):

$$Pr(X = x) = \frac{\Gamma(k+x)}{\Gamma(k)\Gamma(x+1)} p^k (1-p)^x \tag{9}$$

$$x \in \{0, 1, 2, \ldots\} \; k \geq 0 \; 0 < p < 1$$

The mean and variance are defined by equations (10) and (11):

$$E(X) = k\frac{1-p}{p} \tag{10}$$

$$V(X) = k\frac{1-p}{p^2} \tag{11}$$

Solving for k and p in terms of the mean and variance gives:

$$p = \frac{E(X)}{V(X)} \; k = \frac{(E(X))^2}{V(X) - E(X)}$$

By substituting the mean and variance of $S_t$ for E(X) and V(X) respectively gives the Method-of-Moments fit of the Negative Binomial to the distribution of $S_t$, which defines p and k as $$p = \frac{\lambda\mu}{\lambda(\sigma^2+\mu^2)} = \frac{\mu}{\sigma^2+\mu^2} \; k = \frac{(\lambda\mu)^2}{\lambda(\sigma^2+\mu^2)-\lambda\mu} = \frac{\lambda\mu^2}{\sigma^2+\mu^2-\mu}$$

The Negative Binomial (NB) distribution is a member of the class of "infinitely divisible" distributions, which for the method means that if it models one day's sales, it also models two, three, four, etc. days' sales with a simple adjustment of the parameters. Whether using the Log Distribution assumption or not, the Negative Binomial parameter "p" is not a function of $\lambda$. As a result, the parameter "p" essentially represents the packages-per-shopper distribution which is static over time. As a result, "k" is the only Negative Binomial parameter that is a function of time, and it is linear with $\lambda$, whether using the Log Distribution assumption or not.

As is stated above, according to the model of the present invention, the only difference in one day's sales versus two days' sales is that over the course of two days, the expected number of shoppers is twice what it is for one day, or $2\lambda$. Similarly for 3, 4, or any number of consecutive days over a period of anticipated stable short-term demand. Thus, the probability distribution for "n" days of cumulative sales is identical to the single-day distribution in form—i.e., it is Negative Binomial. The only difference is that "$n\lambda$" is used in place of $\lambda$. This completely specifies the probability distribution that describes the cumulative sales over the period of n days.

Based on this information, the Reorder Point formula requires that a reorder point to be established from the maximal sales over the lead time (L+1) days. More specifically, it needs to be determine the number of packages $M_{L+1}$ for which there is a probability of at most $\pi$ that more than $M_{L+1}$ will be sold. This is accomplished by calculating the smallest number of packages in the appropriate Negative Binomial distribution corresponding to a probability of going out-of-stock for a single product at a single store of at most $\pi$. To determine $M_{L+1}$, a simple iterative scheme can be used to calculate $M_{L+1}$. Using MICROSOFT EXCEL's BETADIST function, the strategy is to find the value of the smallest "x", for a given k and p, which will return a function value which is less than or equal to the probability of $\lambda$ of going out-of-stock. As set forth in the equation, x is equal to the maximal sales for L+1 days ($M_{L+1}$). This is expressed mathematically in formula (12), $$\pi \geq \text{BETADIST}(1-p, x+1, k) \tag{12}$$

The smallest value of x, which satisfies the above equation, becomes the reorder point for the stock replenishment system.

In the method of the present invention, the person skilled in the art needs to select either using the Compound Poisson distribution or the Negative Binomial distribution to determine the reorder point. As is mentioned above, the deciding factor is average packages per shopper ($\mu$). When the average packages per shopper distribution is logarithmic, then the Negative Binomial distribution may adequately describe the behavior of the daily sales. When the average packages per shopper is not logarithmic, then the Compound Poisson distribution may be used to model the daily sales.

Figure 3:
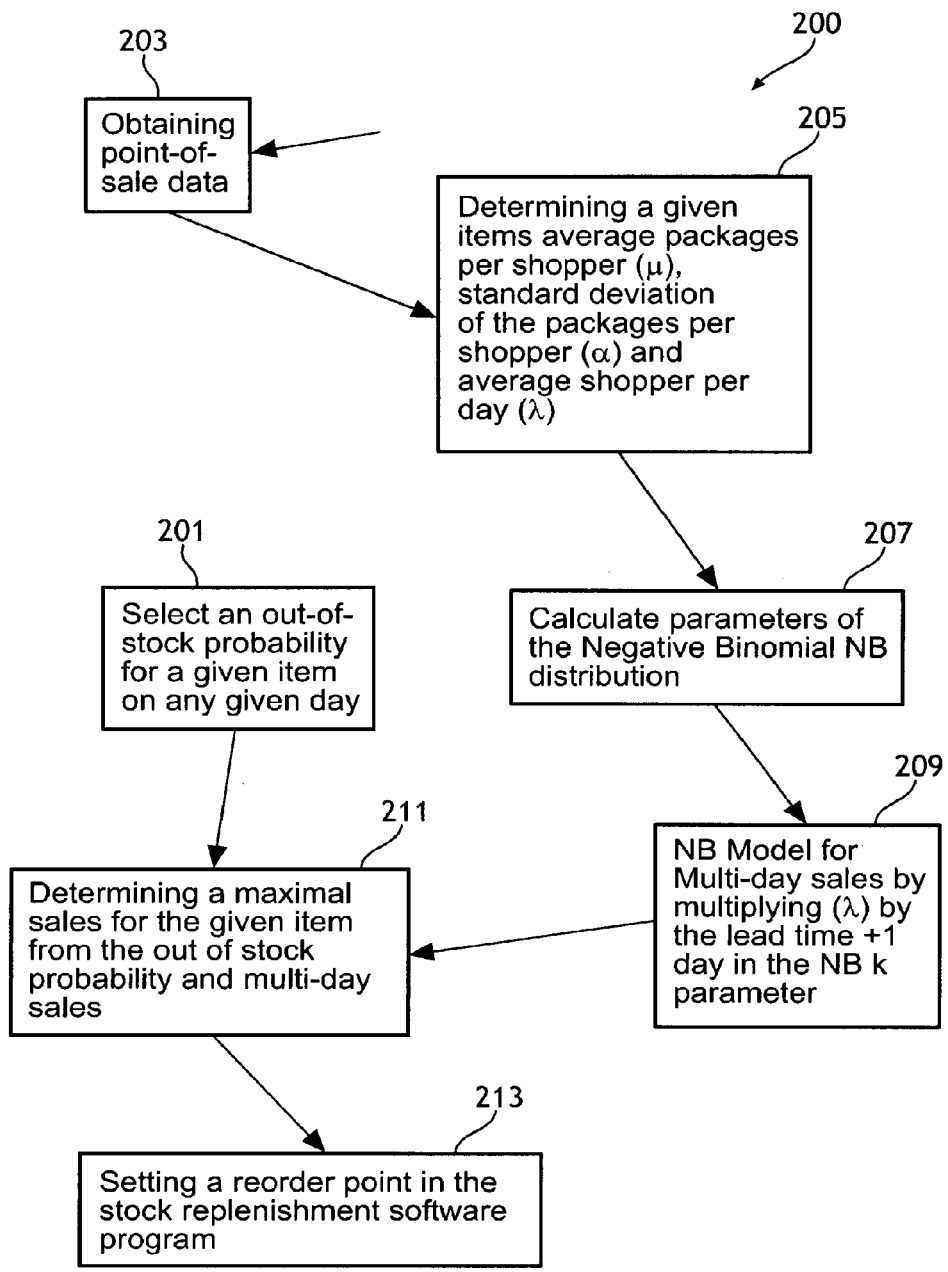
FIG. 3 is a flow diagram of the second embodiment of the present invention, showing the steps to control a single stock replenishment system using a Negative Binomial distribution.

To gain a better understanding of how to use the Negative Binomial distribution to model the daily sales, attention is directed to FIG. 3, which shows a brief overview of this in the form of a flow diagram 200. An out-of-stock probability is selected for a given item for any given day 201. Concurrently, before, or after the out-of-stock probability is defined, point-of-sale data is obtained for the given product for a given time period 203. From the point-of-sale data, the average packages per shopper, the standard deviation of the average packages per shopper and the average shoppers per day are determined 205. The parameters of a Negative Binomial distribution are determined using the average packages per shopper, the standard deviation of the average packages per shopper and the average shoppers per day 207. The shopper per day is adjusted to account for the lead time plus one day to create a multi-day sales model. The maximal sales is determined from the parameters of the Negative Binomial distribution by an iterative method to find the smallest integer value which makes the probability of going out-of-stock less than the out-of-stock probability for the given item 211. Once this value is determined, the reorder point of the stock-replenishment system is set to the determined integer value 213.

The maximal daily sales may be determined in the same manner a described above. To determine $M_{L+1}$, a simple iterative scheme can be used to calculate $M_{L+1}$. Using MICROSOFT EXCEL's BETADIST function, the strategy is to find the value of the smallest "x", for a given k and p, which will return a function value which is less than or equal to the probability of $\pi$ of going out-of-stock. The smallest value of x, which satisfies the equation, becomes the reorder point for the stock replenishment system. In addition the average number of shoppers per day may be determined by dividing the average packages per shopper by the average shoppers per day. Again, the Negative Binomial distribution may be used when the average packages per shopper is between 1 and about 5. However, the Negative Binomial distribution generally models the behavior of the daily sales when the packages per shopper approaches 1, for example, 1 to about 1.5. More typically, the Negative Binomial distribution may adequately describe the behavior of the daily sales when the average packages-per-shopper is between 1 and 1.3.

As described so far, the methods relate to a single stock replenishment system for a single item. The method of the present invention calculates each store's reorder point (R) from the corresponding order lead-time L and the base-order-quantities values for the store as well as statistical information extracted from recent-history point-of-sale data that characterize the nature of the daily store sales. This characterization can be achieved in a variety of ways, but the strategy employed by the method as applied to a single replenishment system may be applied in a similar manner to handle situations with a large number of replenishment systems with a minimum of data processing. In brief, the statistical distribution of daily store sales is derived from a model of daily shopper counts and the packages-per-purchase tendencies. As a result, for items having a similar lead time and similar packages per shopper tendencies, a large number of replenishment systems can be set with a minimal amount of analysis. From this point forward, the present invention is applied to controlling a large number or collection of stock replenishment systems, rather than the single stock-replenishment system previously described in the first and second embodiments of the present invention.

Figure 4:
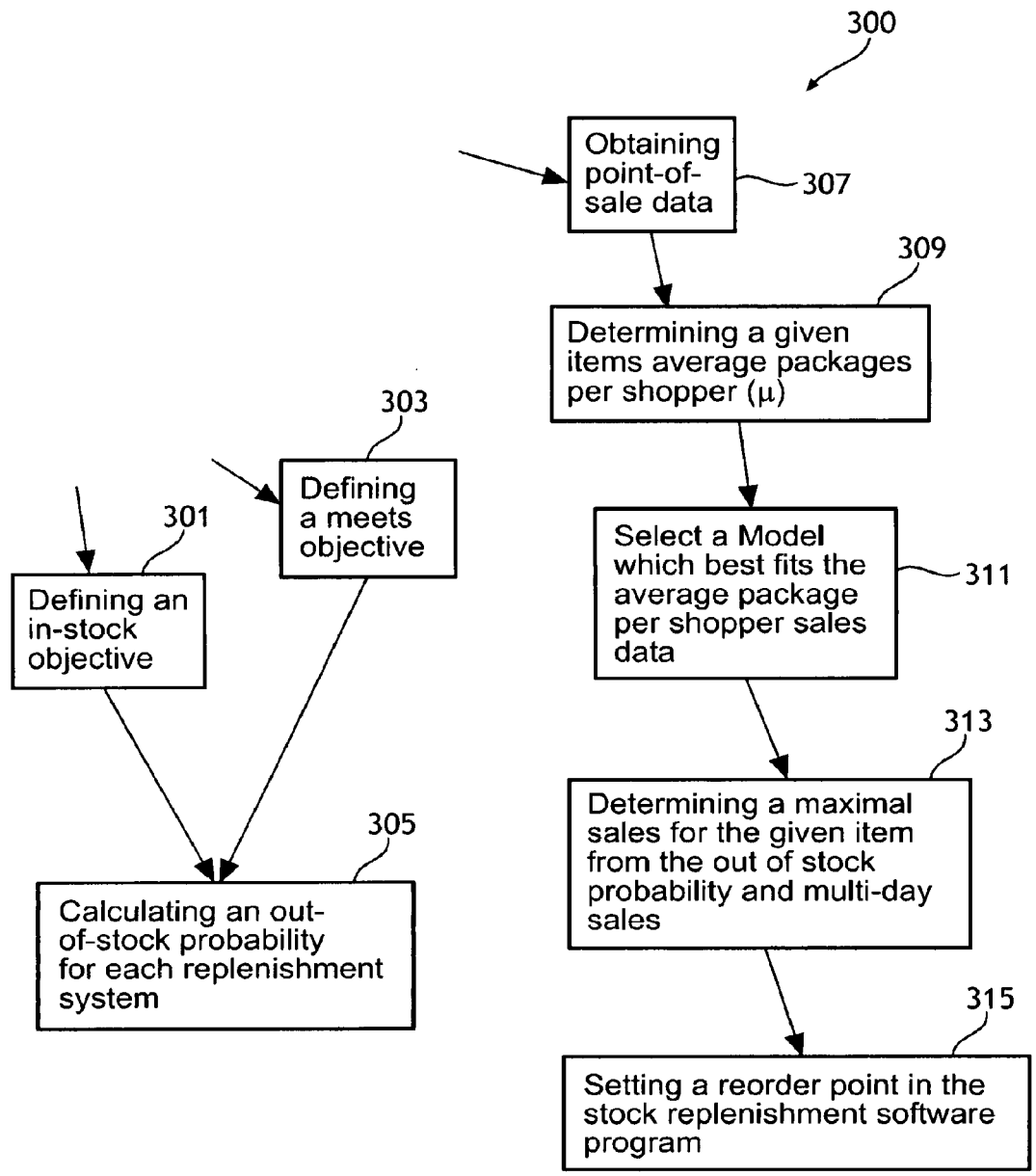
FIG. 4 is a flow diagram of the third embodiment of the present invention, showing the steps to control a collection of stock replenishment systems.

In another embodiment of the present invention, the methods used in the first and second embodiments may be further extended to provide a method of managing a collection of stock replenishment systems. In another embodiment of the present invention, provided is a method of managing a collection of stock replenishment systems in a way that controls a combined measure of in-stock occurrence across the collection of stock replenishment systems. To gain a better understanding of this embodiment of the present invention, attention is directed to FIG. 4 which shows brief overview of the process of this embodiment in the form of a flow diagram 300. In this embodiment, an in-stock objective for any item controlled by the collection of stock replenishment systems for any given day is defined 301. Next, a meets objective, which is the percentage of time that the in-stock objective is desired to be met across all replenishment systems in the collection of stock replenishment systems is defined 303. From the defined in-stock objective and the defined meets objective, a probability of a single store being out-of-stock on any given day across the collection of stock replenishment systems is determined 305. Concurrently, before, or after the out-of-stock probability is defined, point-of-sale data is obtained for the given product for a given time period 307. From the point-of-sale data, an average packages per shopper is determined 309 and a sales model is select 311 to model the sales. Next, the maximal sales for each item on the collection of stock replenishment systems is determined 313, wherein the maximal sales corresponds to the single-store out-of-stock probability calculated. Then the collection of stock replenishments software programs are set to a reorder point based on the maximal sales 315.

In this embodiment, an in-stock objective for any item controlled by the collection of stock replenishment systems for a given day is defined. Generally, the in-stock objective (OBJ) is set to a fairly high number or percentage. For example, such as greater than 90%, typically greater than 95% and more generally greater than 99%, and in each case less than 100%. In one aspect of the present invention, the in-stock objective (OBJ) is generally set between 90% and 99.99%, typically between 0.02% and 5%, more typically between 99.0% and 99.9%. One example of in-stock objective is set at 99.5%. In this embodiment of the present invention, the phrase "defining an in-stock objective" also covers defining an out-of-stock objective. That is, the out-of-stock objective is equal to 1 minus the in-stock objective. (Out-of-stock objective (OOS)=100%−OBJ). Therefore, in the appending claims of the present patent, the step of defining an in-stock objective is the same as defining an out-of stock objective, since the two steps are related as stated.

Next, a percentage ($\beta$) of time that the in-stock objective is desired to be met across all stores utilizing the collection of stock replenishment systems is defined. This percentage of time is referred to as the "meets objective". Generally, the meets objective is set to a fairly high number. For example, such as greater than 80%, typically between about 85% and 95%. In one aspect of the present invention, the meets objective is met may be set at, for example, 90% of the time.

Once the in-stock objective and meets objective are selected or defined, a probability $\pi$ of a single store being out-of-stock on any given day across the collection of stock replenishment systems is determined from the in-stock objective and the meets objective. This determined probability is the probability each stock replenishment system needs to be managed to ensuring that the in-stock objective is met for all stores or replenishment systems (S) is met for the defined percentage of time. The probability ($\pi$) of a specific store being out-of-stock on a given day is calculated using the BETAINV function in MICROSOFT EXCEL. Specifically, the probability ($\pi$) is set in equation (13) to $$\pi=\text{BETAINV}(\beta, S-(S \times Int(S \times OOS), Int(S \times OOS)+1). \quad (13)$$

Before or after the single store probability ($\pi$) is determined, the point-of-sale data for any given item at any given store is obtained. Generally, the point-of-sale data is obtained for a period of time of at least one week. In one embodiment of the present invention, the point-of-sale data is obtained for a period of time between 7 and 180 days. Other periods of time may also be used, such as, for example, periods of time of about 60 to about 120 days. In one specific example, the point-of-sale data is collected over a period of 90 days.

From the point-of-sale data, an average packages per shopper is determined. The average packages per shopper is determined by analyzing the packages per shopper histogram. Also, the standard deviation of the packages per shopper may also be obtained from average packages per shopper histogram. In addition, from the point-of-sale data, the average daily sales may also be determined. Alternatively, the average daily sales could be determined as expected daily sales by using known methods such as a near-term forecast or trailing average daily sales.

A maximal sales which corresponds to the defined single-store out-of-stock probability, is next determined using the given item's packages per shopper histogram and the average daily sales. By "correspond" it is meant what volume of sales that will cause the probability of going out-of-stock to exceed the desired or set value. This volume of sales is the maximal sales. In the present invention, the maximal sales may be determined using various methods, including a Compound Poisson distribution or a Negative Binomial distribution. Determining the maximal sales via the Negative Binomial method and the Compound Poisson distribution as is discussed above in the section describing finding the maximal sales.

Once the maximal sales are determined, the reorder point of the stock replenishment software is set to a set-point based on the maximal sales. Setting the reorder point based on the maximal sales results in the chance of going out-of-stock of the single item to be less than the probability ($\lambda$) which is calculated from the meets objective and the in-stock objective defined by the user. All replenishment systems in the collection are held to the same probability of going out-of-stock.

As is mentioned above, the parameters of the Compound Poisson distribution and the Negative Binomial distribution must be converted to multi-day to account for the lead-time. The average shopper per day ($\lambda$) is multiplied by the lead-time plus one day. For items having the same lead time and a similar average packages per shopper, may have their respective stock replenishment systems set to the same reorder point. This will vastly reduce the amount of work used to determine proper settings for a series of stock replenishment systems to ensure that the items will remain in-stock within a set probability and within the meets objective for all items being controlled by the collection of stock replenishment systems.

In a further embodiment of the present invention, the present invention provides a method of managing a collection of stock replenishment systems across a variety of products which may be located at one or more stores. In this method of the present invention, all of the products controlled by the collection of stock replenishment systems, each have the same lead-time. In the method of this embodiment of the present invention, it is first determined which stores and which items at those stores have the same lead-time.

Figure 5:
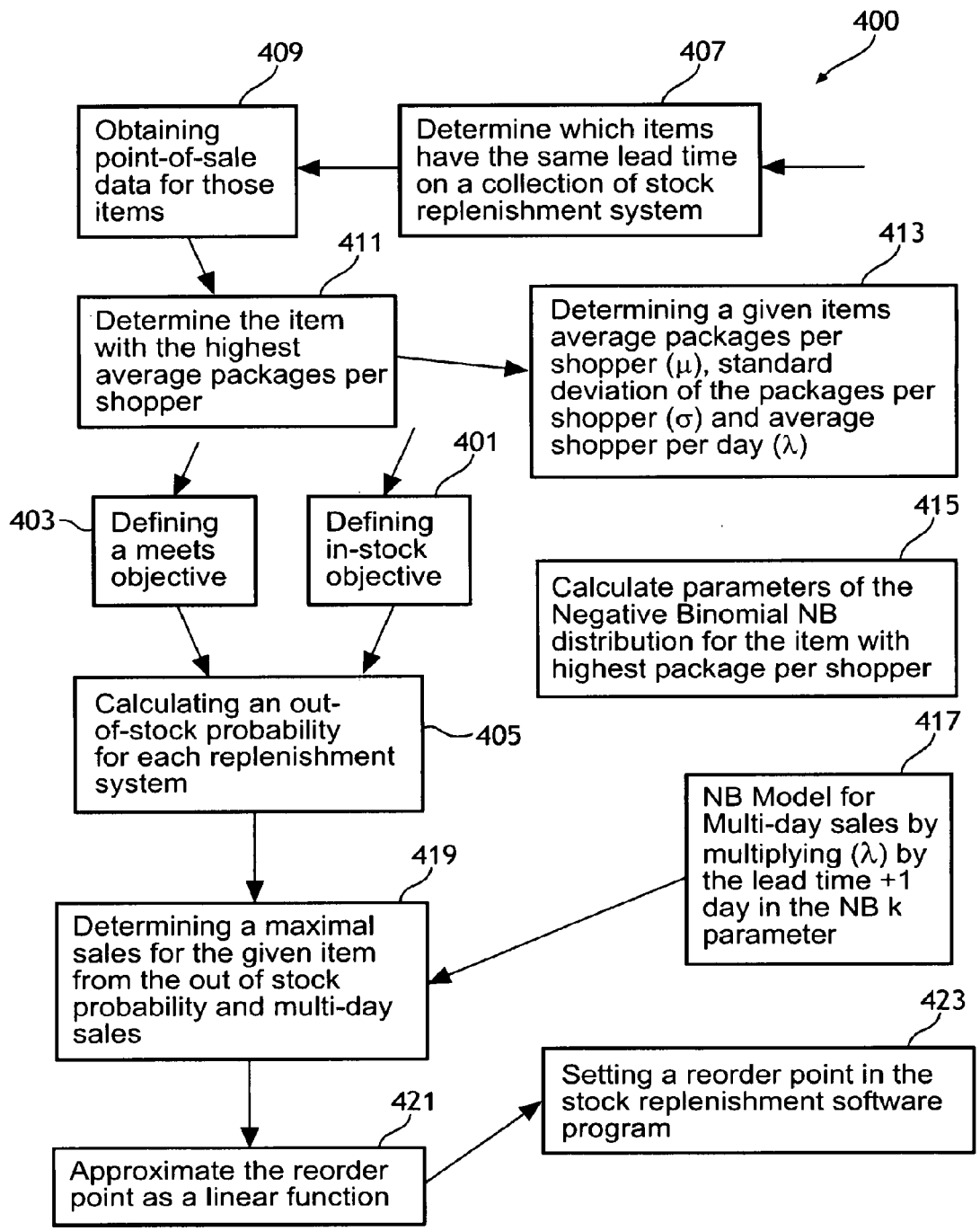
FIG. 5 is a flow diagram of the fourth embodiment of the present invention, showing the steps to control a collection of replenishment system using a Negative Binomial distribution.

To gain a better understanding of this embodiment of the present invention, attention is direct to FIG. 5, which shows which shows brief overview of the process of this embodiment of the present invention in the form of a flow diagram 400. In this embodiment, an in-stock objective for any item controlled by the collection of stock replenishment systems for any given day is defined 401. Next, a meets objective, which is the percentage of time that the in-stock objective is desired to be met across all replenishment systems in the collection of stock replenishment systems is defined 403. From the defined in-stock objective and the defined meets objective, a probability of a single store being out-of-stock on any given day across the collection of stock replenishment systems is determined 405. Concurrently, before, or after the out-of-stock probability is defined, items which have the same lead time on the collection of replenishment systems are identified 407. Next, the point-of-sale data is obtained for the items on the collection of stock replenishment systems having the same lead time for a given time period 409. Once the point-of-sale data is obtained, analysis of the average packages per shopper is undertaken and the item with the highest packages per shopper is determined 411. The item with the highest average packages per shopper, the item's average package per shopper, standard deviation of the average packages per shopper and average shoppers per day are determined 413. Next the parameters of a Negative Binomial distribution are determined 415 and the Negative Binomial model is adjust to account for the lead-time plus one day 417. The reorder point for the item with the highest packages per shopper is determined 419 and the reorder point is approximated as a linear function 421. The linear function is used to define the reorder point for all items on the collection of stock replenishment systems 423.

Once the items are identified, for each store and items at those stores having the same lead-time, a single-store in-stock objective for any item controlled by the collection of stock replenishment systems is defined. Generally, the in-stock objective (OBJ) is set to a fairly high number or percentage. For example, such as greater than 90%, typically greater than 95% and more generally greater than 99%, and in each case less than 100%. In one aspect of the present invention, the in-stock objective (OBJ) is generally set between 90% and 99.99%, typically between 0.02% and 5%, more typically between 99.0% and 99.9%. One example of in-stock objective is set at 99.5%. In this embodiment of the present invention, the phrase "defining an in-stock objective" also covers defining an out-of-stock objective, for the reasons stated above.

Next, a percentage ($\beta$) of time that the in-stock objective is desired to be met across all stores utilizing the collection of stock replenishment systems is defined. This percentage of time is referred to as the "meets objective". Generally, the percentage of time is set to a fairly high number. For example, such as greater than 80%, typically between about 85% and 95%. In one aspect of the present invention, the percentage of time the in-stock objective is met may be set at, for example 90% of the time.

Once the in-stock objective (OBJ) and the meets objective ($\beta$) are defined, for each common lead-time, a single-store out-of-stock probability for any given item controlled by the collection of replenishment systems for any given day is determined from the in-stock objective and the meets objective is desired to be met across all stores. The number of stores or replenishment systems (S) desired to be controlled by the probability of going out-of-stock is also determined. The probability (π) of a specific store being out-of-stock on a given day is calculated using the BETAINV function in MICROSOFT EXCEL. Specifically, the probability (π) is set in the equation (13), as is described above.

For each common lead-time, the highest average package per shopper for all items being sold at all of the stores or being controlled by the collection of replenishment systems is estimated. Next, the parameters of a Negative Binomial distribution-based point for the item with the highest average packages per shopper is determined Typically, the items having an average packages per shopper within about 40% of one another, generally within about 30% of one another may be estimated using the process of the this embodiment of the present invention. It has been discovered, that the reorder point may be approximated as a linear function which is dependent on the expected daily and an intercept with the reorder point axis, by setting the slope of the line and the intercept with the reorder point axis which approximates the line which graphically represents the reorder point for a given meets objective and a given in-stock objective. This is because the Negative Binomial parameter "p" is not a function of π. As a result, the parameter "p" essentially represents the packages-per-shopper distribution which is static over time. As a result, "k" is the only Negative Binomial parameter that is a function of time, and it is linear with λ, whether using the Log Distribution assumption or not.

The collection of stock replenishment software programs controlling the items are all set to a reorder point which is a liner function of average items sold per day and an intercept point on the reorder axis. That is, all items having the same lead-time are set to an equation which defines a line such that the reorder point for any given item in the collection of replenishment systems may be easily calculated by inserting the expected daily sales for a given item. The actual reorder point changes only as a function of the expected daily sales which may be average daily sales from the point-of-sale data or a near-term daily sales forecast, using the methods described above.

Standard or conventional replenishment software, such as INFOREM uses a formula similar in form to equation 14 to calculate the reorder point (ROP).

$$ROP = (L+1) ExpectedDailySales + SafetyStock \quad (14)$$

In equation 14, L is the lead-time. The safety stock is generally set as an estimate of the stock on hand needed to ensure that the item does not go out-of-stock. In many replenishment systems, safety stock is set via a calculation based on the use of a Normal distribution to describe daily sales, which is designed for high-flow (i.e., large average daily sales) situations. However, in the present invention, the linear approximation of the line which sets the slope of the line, and the reorder point axis, when the average daily sales is equal to zero, sets the Safety Stock portion of the formula. As a result, for a given lead-time (L) for a collection of items being controlled by a collection of replenishment systems, all of the replenishment systems can be set to a reorder point which is a function of equation 14, by setting the value of (L+1) to a value which is equal to the slope of the linear approximation based on the highest packages per shopper plus the intercept of the linear approximation on the y-axis, effectively coercing the standard replenishment systems to execute the present invention. The value of (L+1) may be set to an integer value or set to a non-integer value and is equal to the slope of the linear equation that approximates the calculation of the reorder point. This process is exemplified in Example 3 of the present specification.

Stated another way, the reorder point for every replenishment system on the collection of replenishment systems can be easily calculated from equation 14. The safety stock for each of the replenishment systems is the same in each equation, but the expected daily sales is the only variable. This ensures that the collection of replenishment will meet the in-stock objective within the meet objective percent of the time. The method of this embodiment of the present invention allows user to quickly reset the reorder point on replenishment systems based on the average daily sales. In addition, for items have the same or very similar daily sales, the same lead time and similar average packages per shopper, the reorder point for these systems can all be set to the same reorder point.

An important and somewhat surprising result of the last embodiment of the present invention is that under certain, relatively non-restrictive conditions, standard replenishment software can be coerced into executing the method of the present invention by using a common collection of settings across a multitude of store/product combinations. In general terms, the method of the present invention applies a "reorder point/order quantity" system to each store/product combination. The reorder points are calculated specific to each store/product combination in a way that statistically assures the collective performance of all of the store/product replenishment systems. Inputs to the method include an overall out-of-stock target, a large percentage of time the target is to be achieved, and specific statistical summaries of daily point-of-sale retail data. This is further demonstrated in Example 3 of the present specification.

The following examples are used to demonstrate how to use the method of the present invention. The examples are not intended to be limiting but to provide those skilled in the art a better understanding of the present invention.

EXAMPLES

In each of Examples 1 and 2 below, the number of replenishment systems (S) is 1,890 which comes from controlling 21 products at 90 stores. In this Example, the Out-of-Stock Objective (OOS) is set at 0.5%, meaning that the In-Stock is set to 99.5%. For the purposes of these examples, the probability (α) of meeting this Out-of-stock Objective is set at 90%, meaning that for the 21 products at the 90 stores, the products which will be in the store replenishment system will have a 99.5% in-stock objective 90% of the time. For this example, the lead-time is one day and the base order quantity is one case, which contains 4 packages. The probability (π) of a specific store being out-of-stock on a given day is calculated using the BETAINV function as BETAINV (1−(α), S−(S×Int (S×OOS), Int (S×OOS)+1). The probability (π) of a specific store for Example 1 and Example 2 is 0.33% (BETAINV(0.9, 1881, 10). Thus each of the 1,890 replenishment systems must be held to a 0.33% chance of going out-of-stock on any given day.

Example 1

This Example illustrates a low-velocity daily sales situation. Table 1 shows the number of Items Sold on a given day for a period of ninety days.

TABLE 1

(Daily Sales)

| Day | Items Sold |
|---|---|
| 1 | 1 |
| 2 | 0 |
| 3 | 1 |
| 4 | 1 |
| 5 | 0 |
| 6 | 0 |
| 7 | 1 |
| 8 | 2 |
| 9 | 0 |
| 10 | 1 |
| 11 | 2 |
| 12 | 1 |
| 13 | 0 |
| 14 | 2 |
| 15 | 1 |
| 16 | 2 |
| 17 | 1 |
| 18 | 2 |
| 19 | 1 |
| 20 | 1 |
| 21 | 0 |
| 22 | 2 |
| 23 | 2 |
| 24 | 0 |
| 25 | 2 |
| 26 | 0 |
| 27 | 1 |
| 28 | 0 |
| 29 | 2 |
| 30 | 0 |
| 31 | 3 |
| 32 | 1 |
| 33 | 0 |
| 34 | 0 |
| 35 | 1 |
| 36 | 0 |
| 37 | 0 |
| 38 | 1 |
| 39 | 1 |
| 40 | 2 |
| 41 | 0 |
| 42 | 0 |
| 43 | 1 |
| 44 | 0 |
| 45 | 0 |
| 46 | 0 |
| 47 | 0 |
| 48 | 1 |
| 49 | 1 |
| 50 | 0 |
| 51 | 1 |
| 52 | 2 |
| 53 | 0 |
| 54 | 0 |
| 55 | 0 |
| 56 | 0 |
| 57 | 1 |
| 58 | 1 |
| 59 | 0 |
| 60 | 2 |
| 61 | 1 |
| 62 | 0 |
| 63 | 3 |
| 64 | 1 |
| 65 | 0 |
| 66 | 1 |
| 67 | 0 |
| 68 | 1 |
| 69 | 3 |
| 70 | 0 |
| 71 | 0 |
| 72 | 0 |
| 73 | 1 |
| 74 | 0 |
| 75 | 1 |
| 76 | 2 |
| 77 | 1 |
| 78 | 0 |
| 79 | 1 |
| 80 | 2 |
| 81 | 0 |
| 82 | 0 |
| 83 | 3 |
| 84 | 1 |
| 85 | 1 |
| 86 | 0 |
| 87 | 0 |
| 88 | 2 |
| 89 | 0 |
| 90 | 0 |

From the point-of-sale data, the average daily sales were determined to be 0.81 packages per day. In addition, the packages per shopper histogram had a distribution shown in Table 2.

TABLE 2

(Packages per Shopper Histogram)

| | Packages per Shopper | | | | |
|---|---|---|---|---|---|
| | 1 | 2 | 3 | 4 | 5 |
| % of Baskets | 97.4% | 2.3% | 0.2% | 0.0% | 0.0% |

Analysis of the packages per shopper histogram showed that the average packages per shopper ($\mu$) was 1.03 with a standard deviation ($\alpha$) of 0.20. From this information, the Average Shoppers per Day ($\lambda$) is calculated from the Average Daily Sales and the Average Packages-per-Shopper using the following equation.

$$\lambda = \frac{Avg\left(\frac{packages}{day}\right)}{Avg\left(\frac{packages}{shopper}\right)} = \frac{0.81}{1.03} = 0.79$$

During the 90-day period, there was an average of 0.79 shoppers on each day that purchased the item being tracked.

As is stated above, the lead time L is one day. Therefore, the Single-Store Multi-Day Sales Model is fit using the Method of Moments formulas substituting $2\lambda$ for $\lambda$ to reflect L+1=2 days of shoppers:

$$p = \frac{\mu}{\sigma^2 + \mu^2} = \frac{1.03}{0.20^2 + 1.03^2} = 0.94$$

$$k = \frac{\lambda\mu^2}{\sigma^2 + \mu^2 - \mu} = \frac{(2 \cdot 0.79) \cdot 1.03^2}{0.20^2 + 1.03^2 = 1.03} = 24.2$$

To calculate the reorder point, the BETADIST function in MICROSOFT EXCEL was used. The function has the formula BETADIST (1−p, x+1, k), where p and k are calculated above. In this formula, x is the maximal sales $M_{L+1}$ and to find the maximal sales to establish the reorder point, it is necessary to use an iterative process to determine what the smallest value of x, which will satisfy the equation:

$$\pi \geq BETADIST(1-p, x+1, k)(\ ), \text{ where } \pi=0.0033$$

$$x=5 BETADIST(1-0.94, 5+1, 24.2)=0.0069$$

$$x=6 BETADIST(1-0.94, 6+1, 24.2)=0.0017$$

As a result, the maximal sales $M_{L+1}$ is 6. That is, if the inventory falls below 6 packages, the probability of an out-of-stock event is greater than the set probability Therefore, the reorder point is set at 6 packages for this particular replenishment system.

Figure 6:
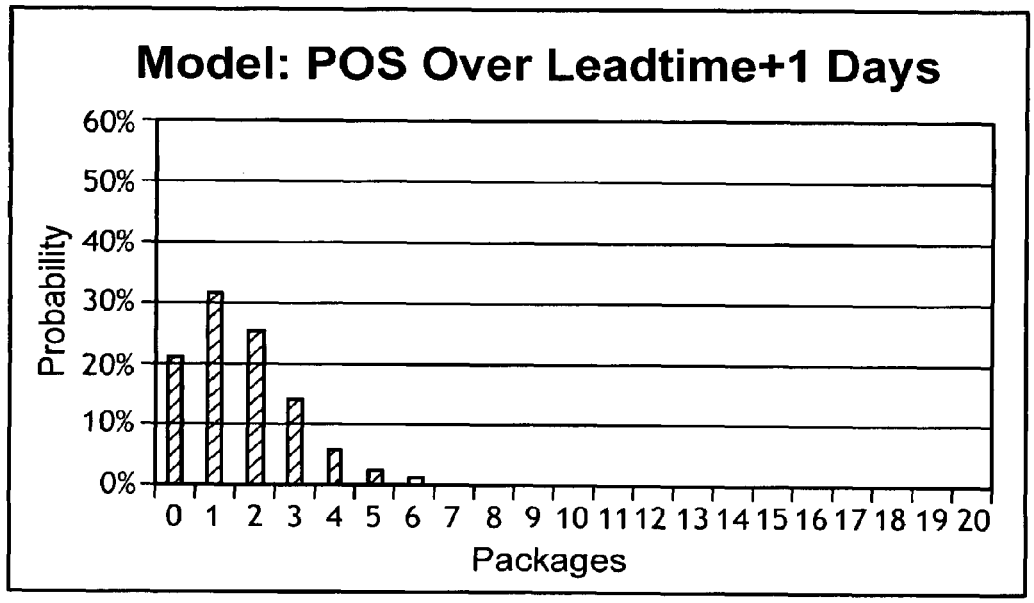
FIG. 6 shows the model probability distribution for the number of packages per day for example 1 over a period of two days.
Figure 7:
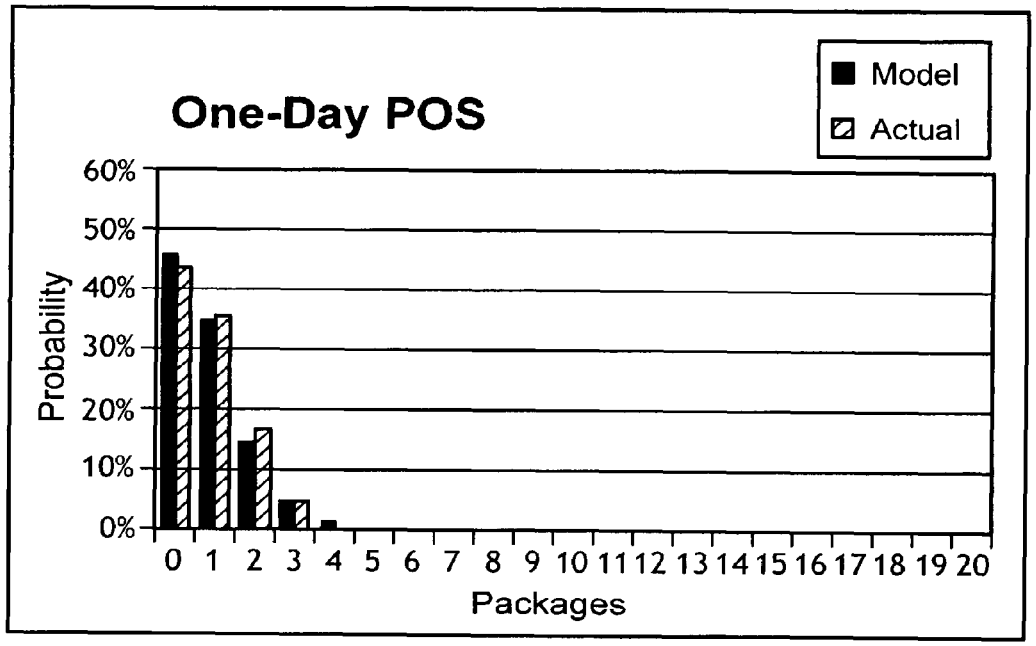
FIG. 7 shows the one day probability distribution of the model process of the present invention verses the actual sales from the point-of-sale data for example 1.

This Negative Binomial distribution is shown in FIG. 6 and FIG. 7. FIG. 6 shows the model for lead-time plus one day and FIG. 7 shows the one day point-of-sale date compared to the one-day model. As can be seen, the model closely approximates the actual one day sales.

Example 2

This Example illustrates a high-velocity daily sales situation. Table 3 shows the number of Items Sold on a given day for a period of ninety days.

TABLE 3

(Daily Sales)

| Day | Items Sold |
|---|---|
| 1 | 10 |
| 2 | 12 |
| 3 | 14 |
| 4 | 14 |
| 5 | 7 |
| 6 | 11 |
| 7 | 4 |
| 8 | 5 |
| 9 | 4 |
| 10 | 3 |
| 11 | 5 |
| 12 | 6 |
| 13 | 3 |
| 14 | 11 |
| 15 | 8 |
| 16 | 6 |
| 17 | 6 |
| 18 | 4 |
| 19 | 4 |
| 20 | 3 |
| 21 | 5 |
| 22 | 5 |
| 23 | 5 |
| 24 | 8 |
| 25 | 5 |
| 26 | 6 |
| 27 | 11 |
| 28 | 2 |
| 29 | 5 |
| 30 | 5 |
| 31 | 4 |
| 32 | 7 |
| 33 | 9 |
| 34 | 4 |
| 35 | 8 |
| 36 | 6 |
| 37 | 6 |
| 38 | 10 |
| 39 | 5 |
| 40 | 4 |
| 41 | 5 |
| 42 | 7 |
| 43 | 8 |
| 44 | 8 |
| 45 | 6 |

TABLE 3-continued (Daily Sales)

| Day | Items Sold |
|---|---|
| 46 | 4 |
| 47 | 3 |
| 48 | 8 |
| 49 | 5 |
| 50 | 8 |
| 51 | 0 |
| 52 | 8 |
| 53 | 8 |
| 54 | 3 |
| 55 | 3 |
| 56 | 11 |
| 57 | 15 |
| 58 | 5 |
| 59 | 2 |
| 60 | 7 |
| 61 | 6 |
| 62 | 3 |
| 63 | 3 |
| 64 | 13 |
| 65 | 11 |
| 66 | 14 |
| 67 | 6 |
| 68 | 5 |
| 69 | 10 |
| 70 | 7 |
| 71 | 15 |
| 72 | 9 |
| 73 | 6 |
| 74 | 2 |
| 75 | 6 |
| 76 | 6 |
| 77 | 7 |
| 78 | 12 |
| 79 | 5 |
| 80 | 6 |
| 81 | 10 |
| 82 | 8 |
| 83 | 3 |
| 84 | 3 |
| 85 | 8 |
| 86 | 7 |
| 87 | 4 |
| 88 | 6 |
| 89 | 7 |
| 90 | 8 |

From the point-of-sale data, the average daily sale was determined to be 6.60 packages per day. In addition, the packages per shopper histogram had a distribution shown in Table 4.

TABLE 4

(Packages per Shopper Histogram)

| | Packages per Shopper | | | | |
|---|---|---|---|---|---|
| | 1 | 2 | 3 | 4 | 5 |
| % of Baskets | 91.7% | 6.9% | 0.9% | 0.3% | 0.1% |

Based on the packages per shopper histogram, the average packages per shopper ($\mu$) was 1.10 with a standard deviation ($\sigma$) of 0.41. From this information, the Average Shoppers per Day ($\lambda$) is calculated from the Average Daily Sales and the Average Packages-per-Shopper using the following equation.

$$\lambda = \frac{Avg\left(\frac{packages}{day}\right)}{Avg\left(\frac{packages}{shopper}\right)} = \frac{6.60}{1.10} = 6.0$$

During the 90-day period, mere was an average of 6 shoppers on each day that purchased the item being tracked. The Single-Store Multi-Day Sales Model is fit using the Method of Moments formulas substituting $2\lambda$ for $\lambda$ to reflect the lead time (L)+1 day=2 days of shoppers:

$$p = \frac{\mu}{\sigma^2 + \mu^2} = \frac{1.10}{0.41^2 + 1.10^2} = 0.80$$

$$k = \frac{\lambda \mu^2}{\sigma^2 + \mu^2 - \mu} = \frac{(2 \cdot 6) \cdot 1.10^2}{0.41^2 + 1.10^2 - 1.10} = 53.8$$

To calculate the reorder point, the BETADIST function in Microsoft Excel was used. The function has the formula BETADIST (1−p, x+1, k), where p and k are calculated above. In this formula, x is the maximal sales $M_{L+1}$ and to find the maximal sales to establish the reorder point, it is necessary to use an iterative process to determine what the smallest value of x which will satisfy the equation:

$\pi \geq$ BETADIST$(1-p, x+1, k)$, where $\pi = 0.0033$ $x=25$ BETADIST$(1-0.8, 25+1, 53.8) = 0.0046$ $x=26$ BETADIST$(1-0.8, 26+1, 53.8) = 0.0027$ As a result, the maximal sales $M_{L+1}$ is 26, therefore the reorder point is set at 26 packages. That is, if the inventory falls below 26 packages, the probability of an out-of-stock event is greater than the set probability.

Figure 8:
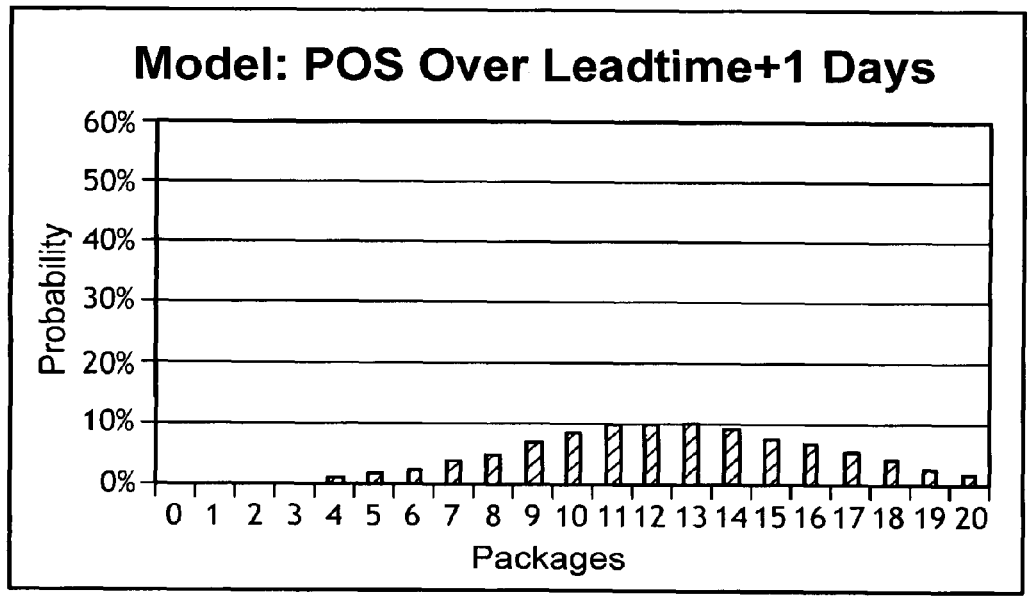
FIG. 8 shows the model probability distribution for the number of packages per day for example 2 over a period of two days.
Figure 9:
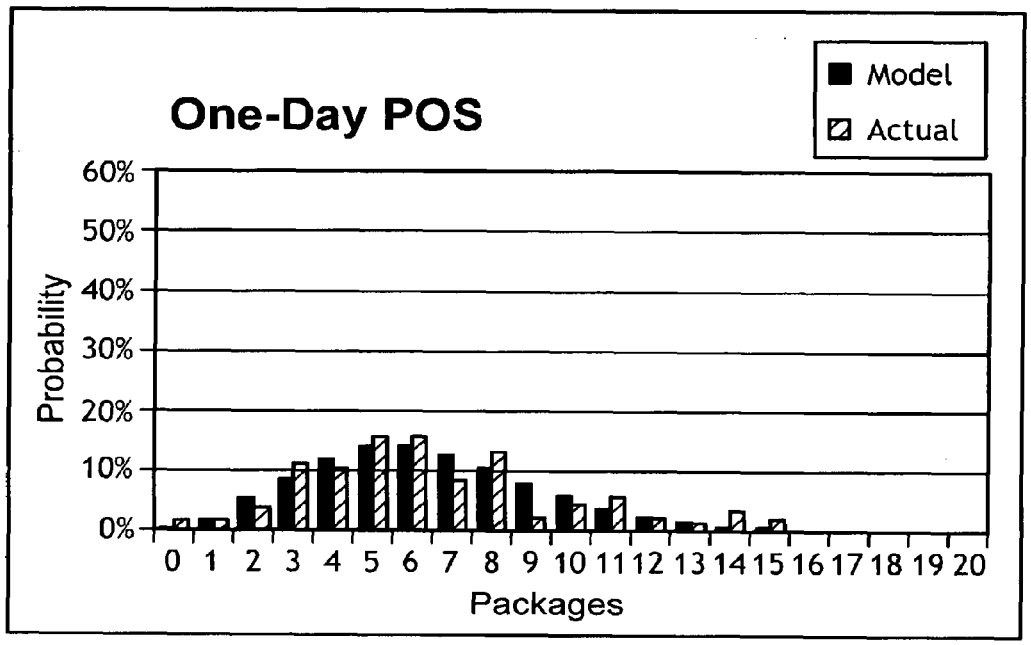
FIG. 9 shows the one day probability distribution of the model process of the present invention verses the actual sales from the point-of-sale data for example 2.

This Negative Binomial distribution is shown in FIG. 8 and FIG. 9. FIG. 8 shows the model for lead time plus one day and FIG. 9 shows the one day point-of-sale date compared to the one-day model. As can be seen, the model closely approximates the actual one day sales.

Example 3

In this example, the number of replenishment systems (S) is 3,500. In this Example, the Out-of-Stock Objective (OOS) is set at 0.5%, meaning that the In-Stock Objective is set to 99.5%. For the purposes of these examples, the percentage of time meeting the in-stock objective ($\beta$) of meeting this in-stock Objective is set at 90%, meaning that the replenishment systems will have a 99.5% in-stock objective 90% of the time. For this example, the lead-time is one day. As a result, S=3,500 stores OBJ=99.5% (equates to an out-of-stock target of 0.5%)

The probability ($\pi$) of a specific store being out-of-stock on a given day is calculated using the BETAINV function in MICROSOFT EXCEL as BETAINV $(1-(\alpha), S-(S \times \text{Int} (S \times \text{OOS}), \text{Int} (S \times \text{OOS})+1)$. The probability ($\pi$) of a specific store for Example 3 is 0.37% (BETAINV(0.9, 3483, 18)). Thus each of the 3,500 replenishment systems must be held to a 0.37% chance of going out-of-stock on any given day. From this information, the Table 5 for the reorder point can be determined for various packages per shopper histograms.

TABLE 5

| | AvgPkgsPerShopper | | | | | | | | | |
|---|---|---|---|---|---|---|---|---|---|---|
| AvgDailySales | 1.01 | 1.02 | 1.03 | 1.04 | 1.05 | 1.06 | 1.07 | 1.08 | 1.09 | 1.10 |
| 0.2 | 3 | 3 | 3 | 3 | 3 | 3 | 3 | 3 | 3 | 3 |
| 0.3 | 3 | 3 | 3 | 4 | 4 | 4 | 4 | 4 | 4 | 4 |
| 0.4 | 4 | 4 | 4 | 4 | 4 | 4 | 4 | 4 | 4 | 4 |
| 0.5 | 5 | 5 | 5 | 5 | 5 | 5 | 5 | 5 | 5 | 5 |
| 0.6 | 5 | 5 | 5 | 5 | 5 | 5 | 5 | 5 | 5 | 5 |
| 0.7 | 5 | 5 | 6 | 6 | 6 | 6 | 6 | 6 | 6 | 6 |
| 0.8 | 6 | 6 | 6 | 6 | 6 | 6 | 6 | 6 | 6 | 6 |
| 0.9 | 6 | 6 | 6 | 7 | 7 | 7 | 7 | 7 | 7 | 7 |
| 1 | 7 | 7 | 7 | 7 | 7 | 7 | 7 | 7 | 7 | 7 |
| 1.2 | 7 | 8 | 8 | 8 | 8 | 8 | 8 | 8 | 8 | 8 |
| 1.4 | 8 | 8 | 8 | 8 | 9 | 8 | 9 | 9 | 9 | 9 |
| 1.6 | 9 | 9 | 9 | 9 | 9 | 9 | 9 | 9 | 10 | 10 |
| 1.8 | 10 | 10 | 10 | 10 | 10 | 10 | 10 | 10 | 10 | 10 |
| 2 | 10 | 10 | 11 | 11 | 11 | 11 | 11 | 11 | 11 | 11 |
| 2.2 | 11 | 11 | 11 | 11 | 11 | 11 | 11 | 12 | 12 | 12 |
| 2.4 | 12 | 12 | 12 | 12 | 12 | 12 | 12 | 12 | 12 | 13 |
| 2.6 | 12 | 12 | 12 | 13 | 13 | 13 | 13 | 13 | 13 | 13 |
| 2.8 | 13 | 13 | 13 | 13 | 13 | 13 | 14 | 14 | 14 | 14 |
| 3 | 14 | 14 | 14 | 14 | 14 | 14 | 14 | 14 | 14 | 15 |
| 3.2 | 14 | 14 | 14 | 14 | 15 | 15 | 15 | 15 | 15 | 15 |
| 3.4 | 15 | 15 | 15 | 15 | 15 | 15 | 15 | 16 | 16 | 16 |
| 3.6 | 15 | 16 | 16 | 16 | 16 | 16 | 16 | 16 | 16 | 16 |
| 3.8 | 16 | 16 | 16 | 16 | 16 | 17 | 17 | 17 | 17 | 17 |
| 4 | 17 | 17 | 17 | 17 | 17 | 17 | 17 | 17 | 18 | 17 |
| 4.2 | 17 | 17 | 17 | 18 | 18 | 18 | 18 | 18 | 18 | 18 |
| 4.4 | 18 | 18 | 18 | 18 | 18 | 18 | 18 | 19 | 19 | 19 |
| 4.6 | 18 | 18 | 19 | 19 | 19 | 19 | 19 | 19 | 19 | 19 |
| 4.8 | 19 | 19 | 19 | 19 | 19 | 20 | 20 | 20 | 20 | 20 |
| 5 | 20 | 20 | 20 | 20 | 20 | 20 | 20 | 20 | 20 | 21 |

Figure 10:
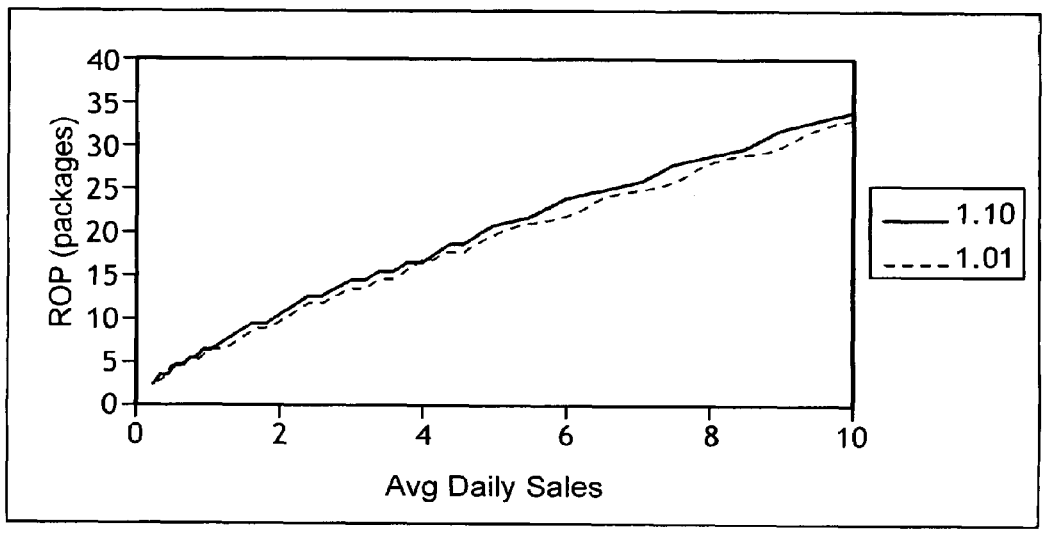
FIG. 10 shows the graph of the curves for the reorder point vs. the average daily sales for Example 3 for an average packages per shopper of 1.01 and 1.10.

The above information can be plotted onto a graph having an x-axis of average daily sales and the y-axis of Reorder point. FIG. 10 shows a graft of the average packages per shopper histogram of 1.01 and the average packages per shopper histogram 1.10. The "step function" aspect of the graph comes from the fact that ROP values must be integers.

As can be seen in FIG. 10, there is little difference between the two histograms when plotted as a function of average sales. As a result, the two histograms could be viewed as a single line. The "extreme" is the 1.10 average packages per shopper, since this gives uniformly the highest ROP values. In the method of the present invention, to simplify the setting of the replenishment software, the curve for 1.10 average packages per shopper could be applied to all products in the collection of replenishment systems. The only loss would be in having slightly higher ROP values (by about 1 package) for the products and average packages per shopper closer to 1.01 curve.

In the method of the present invention, the curve for the 1.10 average packages per shopper is next approximated using a linear approximation. In using this approximation, the straight line is approximated in such a way that no reorder point is under shot. The line should be fitted in such a way as to fit the practical range of the average daily sales. An approximation is shown in FIG. 11.

Figure 11:
FIG. 11 shows the linear approximation of the curves for the reorder point vs. the average daily sales for Example 3 for an average packages per shopper of 1.10.

The slope of the line in FIG. 11 is about 3 and the intercept is 5.7. Products having average daily sales between 2 and 8 are modeled nearly perfectly by the line. Outside of this range, the ROPs will be slightly higher than necessary. The discrepancy on the low end is trivial despite its magnitude. For ROPs below 10, the amount of product on hand necessary to keep the shelves full is somewhat higher than is actually necessary, thereby reducing the chance of going out-of-stock for these slower selling products. This rationale can give preference to the straight-line approximation over the curve itself.

As is mentioned above, standard replenishment computer programs basically designed to handle big-volume distribution centers to store replenishment will have implemented the normal-theory ROP equation:

$$ROP = (L+1)\text{AvgDailySales} + \text{SafetyStock}$$

This equation is a straight line with slope of L+1 and intercept of Safety Stock. This means that standard replenishment software is already designed to handle the DC-to-Store replenishment method presented here. All that needs to be done is to "spoof" the software's slope and intercept values to match the slope and intercept based on the linear approximation line used in the method of the present invention.

In Example 3, the slope and intercept of the approximation line were 3 and 5.7 respectively, for a product having an average packages per shopper histogram of 1.10. Therefore, to implement the method of the present invention, in the standard replenishment software, L is set to 2 and the safety stock is set to 6, since the standard replenishment software typically requires the safety stock to be an integer. Each of the 3,500 replenishment systems would be set to these parameters, thereby simplifying the way a collection of replenishment systems are set-up. Conventionally, each replenishment system would have been set-up independently of one another. As a result, the present invention provides a way to effectively manage a collection of replenishment systems by setting the parameter to the same parameters, providing a single solution to the replenishment software parameters for all products being managed with the same lead-time.

In addition to being applicable to the retail store stock, the present invention could also be used in restocking supplies, such as in hospitals, restocking parts, such as automotive parts and in other situations where products or materials need to be reordered on an as needed basis.

Although the present invention has been described with reference to various embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A method comprising:
   receiving a selection of an acceptable out-of-stock probability for an item, the acceptable out-of-stock probability indicating an acceptable risk of the item going out-of-stock at a particular retail store;
   accessing sales data for the item, wherein the sales data is for a period of time;
   determining, using a computing device, a quantity of packages of the item sold during the period of time based at least partly on the sales data;
   determining a quantity of shoppers per day that purchased the item based at least partly on the sales data;
   determining, using the computing device, a maximal sales estimate indicating a volume of sales that will cause an out-of-stock probability for the item to exceed the acceptable out-of-stock probability, wherein the maximal sales estimate is based on at least the determined quantity of packages of the item sold during the period of time, the determined shoppers per day, the acceptable out-of-stock probability, and a reorder time for receiving an additional quantity of the item after an order for the additional quantity of the item is placed, wherein the reorder time includes a lead time plus one day to account for sales occurring during a reorder day; and
   determining a reorder point based on the determined maximal sales estimate for the reorder time, wherein the reorder point indicates a minimum quantity of packages at the particular retail store for maintaining the out-of-stock probability of the item at the particular retail store at or below the acceptable out-of-stock probability.

2. The method according to claim 1, wherein determining the maximal sales estimate comprises determining the maximal sales estimate using a probability distribution.

3. The method according to claim 2, further comprising selecting a type of the probability distribution based on a distribution of a quantity of packages per shopper per day, wherein the quantity of packages per shopper per day is based at least on the quantity of packages of the item sold during the period of time and the quantity of shoppers per day that purchased the item.

4. The method according to claim 2, wherein the probability distribution comprises a Negative Binomial distribution.

5. The method according to claim 2, wherein the probability distribution comprises a compound Poisson distribution.

6. The method according to claim 5, wherein a negative binomial distribution, is used as an approximation of the compound Poisson distribution.

7. The method according to claim 1, wherein an expected daily sales is determined from the sales data and the expected daily sales is used in determining the quantity of shoppers per day.

8. The method according to claim 1, wherein said determining the maximal sales estimate comprises determining a maximal daily sales estimate such that a probability that the maximal daily sales estimate is exceeded for any given day is at or below the acceptable out of stock probability.

9. The method according to claim 8, wherein said determining the reorder point based on the determined maximal sales estimate for the reorder time comprises multiplying the maximal daily sales estimate by the lead time plus one day of the reorder time in order to determine the maximal sales estimate for the reorder time.

10. A system for managing inventory comprising:
   a computing system configured to execute instruction in order to cause the computing system to perform operations comprising:
      receiving a selection of an acceptable out-of-stock probability for an item, the acceptable out-of-risk probability indicating an acceptable risk of the item going out-of-stock at a particular retail store;
      accessing sales data for the item, wherein the sales data is for a period of time;
      determining a quantity of shoppers per day that purchased the item based at least partly on the sales data;
      determining a maximal sales estimate indicating a volume of sales that will cause an out-of-stock probability for the item to exceed the acceptable out-of-stock probability, wherein the maximal sales estimate is determined based on a probability model and at least the quantity of shoppers per day and a reorder time for receiving an additional quantity of the item after an order for the additional quantity is placed, wherein the reorder time includes a lead time plus one day to account for sales occurring during a reorder day; and
      determining a reorder point based on the determined maximal sales estimate for the reorder time, wherein the reorder point indicates a minimum quantity of packages at the particular retail store for maintaining the out-of-stock probability for the item at the particular retail store at or below the acceptable out-of-stock probability.

11. The system of claim 10, wherein the probability model comprises a negative binomial model.

12. The system of claim 10, wherein the probability model comprises a compound distribution model.

13. The system of claim 10, wherein a parameter of the probability model is multiplied by the reorder time to account for multi-day sales.

14. The system of claim 10, wherein the maximal sales estimate is determined for a period of time comprising multiple days.

15. A computer-readable medium having stored thereon instructions that, in response to execution by a computing system, cause the computing system to perform operations comprising:
   accessing a selection of an acceptable out-of-stock probability for an item indicating an acceptable risk of the item going out-of-stock at a particular location; and
   determining a reorder point based at least partly on a maximal sales estimate for a reorder time, wherein the reorder point indicates a minimum quantity of packages at the particular location for maintaining an out-of-stock probability at the particular location at or below the acceptable out-of-stock probability;
   wherein the maximal sales estimate indicates a volume of sales that will cause the out-of-stock probability for the item to exceed the acceptable out-of-stock probability, wherein the maximal sales is determined based on a probability model and at least a quantity of shoppers per day and the reorder time for receiving an additional quantity of the item after an order for the additional quantity is placed, wherein the reorder time includes a lead time plus one day to account for sales occurring during a reorder day.

16. The computer-readable medium of claim 15, wherein the probability model comprises a negative binomial model.

17. The computer-readable medium of claim 15, wherein the probability model comprises a compound distribution model.

18. The computer-readable medium of claim 15, wherein a parameter of the probability model is multiplied by the reorder time.

19. The computer-readable medium of claim 15, wherein the reorder time accounts for a day the order is placed.

20. The computer-readable medium of claim 15, wherein the maximal sales estimate is determined for a period of time comprising multiple days.

21. The computer-readable medium of claim 15, wherein the location comprises a retail store.

22. A method comprising:
   accessing a selection of an acceptable out-of-stock probability for an item, the acceptable out-of-stock probability indicating an acceptable risk of the item going out-of-stock at a particular retail store;
   accessing sales data for the item, wherein the sales data is for a period of time;
   determining, using a computing device, a quantity of packages of the item sold during the period of time based at least partly on the sales data;
   determining, using the computing device, a maximal sales estimate indicating a volume of sales that will cause an out-of-stock probability for the item to exceed the acceptable out-of-stock probability, wherein the maximal sales estimate is based on at least the determined quantity of packages of the item sold during the period of time, the acceptable out-of-stock probability, and a reorder time for receiving an additional quantity of the item after an order for the additional quantity of the item is placed, wherein the reorder time includes a lead time plus one day to account for sales occurring during a reorder day; and
   determining a reorder point based on the determined maximal sales estimate for the reorder time, wherein the reorder point indicates a minimum quantity of packages at the particular retail store for maintaining the out-of-stock probability of the item at the particular retail store at or below the acceptable out-of-stock probability.

23. The method according to claim 22, wherein the maximal sales estimate is determined using a probability distribution.

24. The method according to claim 23, wherein the probability distribution comprises a negative binomial distribution.

25. The method according to claim 23, wherein the probability distribution comprises a compound Poisson distribution.

* * * * *

UNITED STATES PATENT AND TRADEMARK OFFICE
CERTIFICATE OF CORRECTION

| | | |
|---|---|---|
| PATENT NO. | : 8,413,883 B2 | Page 1 of 1 |
| APPLICATION NO. | : 13/035751 | |
| DATED | : April 9, 2013 | |
| INVENTOR(S) | : McCormick | |

It is certified that error appears in the above-identified patent and that said Letters Patent is hereby corrected as shown below:

In the Specifications

In Column 8, Line 3, delete "sales a" and insert -- sales $\alpha$ --, therefor.

In Column 8, Line 8, delete "sales a" and insert -- sales $\alpha$ --, therefor.

In Column 11, Line 2, delete "average ($\pi$)" and insert -- average ($\lambda$) --, therefor.

In Column 11, Line 16, delete "Variance=V($X_1$)=$\sigma^2$" and insert -- Variance=V($X_i$)=$\sigma^2$ --, therefor.

In Column 14, Line 57, delete "probability of $\lambda$" and insert -- probability of $\pi$ --, therefor.

In Column 15, Line 31, delete "manner a described" and insert -- manner as described --, therefor.

In Column 17, Line 7, delete "S-(S×Int(S×OOS)," and insert -- S-(S×Int(S×OOS)), --, therefor.

In Column 17, Line 44, delete "probability ($\lambda$)" and insert -- probability ($\pi$) --, therefor.

In Column 17, Line 51, delete "shopper per day ($\lambda$)" and insert -- shopper per day ($\pi$) --, therefor.

In Column 19, Lines 22-23, delete "function of $\pi$." and insert -- function of $\lambda$. --, therefor.

In Column 20, Lines 54-55, delete "S-(S×Int(S×OOS)," and insert -- S-(S×Int(S×OOS)), --, therefor.

In Column 20, Lines 56-57, delete "(BETAINV(0.9, 1881, 10)." and insert -- (BETAINV(0.9, 1881, 10)). --, therefor.

In Column 25, Line 7, delete "mere" and insert -- there --, therefor.

In the Claims

In Column 28, Line 55, in Claim 6, delete "distribution, is" and insert -- distribution is --, therefor.

Signed and Sealed this
Eleventh Day of March, 2014

Michelle K. Lee
*Deputy Director of the United States Patent and Trademark Office*